(12) United States Patent
Flitsch et al.

(10) Patent No.: US 9,988,772 B2
(45) Date of Patent: Jun. 5, 2018

(54) METHODS AND APPARATUS FOR MOBILE ADDITIVE MANUFACTURING OF ADVANCED STRUCTURES AND ROADWAYS

(71) Applicants: Robert A. Flitsch, New Windsor, NY (US); Frederick A. Flitsch, New Windsor, NY (US)

(72) Inventors: Robert A. Flitsch, New Windsor, NY (US); Frederick A. Flitsch, New Windsor, NY (US)

(*) Notice: Subject to any disclaimer, the term of this patent is extended or adjusted under 35 U.S.C. 154(b) by 0 days. days.

(21) Appl. No.: 15/639,766

(22) Filed: Jun. 30, 2017

(65) Prior Publication Data
US 2017/0298580 A1    Oct. 19, 2017

Related U.S. Application Data

(63) Continuation-in-part of application No. 14/310,556, filed on Jun. 20, 2014, now Pat. No. 9,724,877, which is a continuation-in-part of application No. 14/310,443, filed on Jun. 20, 2014.

(60) Provisional application No. 61/838,302, filed on Jun. 23, 2013.

(51) Int. Cl.
| | |
|---|---|
| *B33Y 10/00* | (2015.01) |
| *B33Y 30/00* | (2015.01) |
| *E01C 23/01* | (2006.01) |
| *E01C 23/06* | (2006.01) |
| *E01C 11/00* | (2006.01) |
| *B33Y 50/02* | (2015.01) |
| *B29L 31/00* | (2006.01) |

(52) U.S. Cl.
CPC ............ *E01C 23/065* (2013.01); *B33Y 10/00* (2014.12); *B33Y 30/00* (2014.12); *E01C 11/005* (2013.01); *B29L 2031/776* (2013.01); *B33Y 50/02* (2014.12); *E01C 23/01* (2013.01)

(58) Field of Classification Search
CPC ............ B29C 67/0088; B29C 67/0085; B29C 67/0055; B33Y 10/00; B33Y 50/02; B33Y 30/00; E01C 11/005; E01C 23/065; E01C 23/01; B29L 2031/776
See application file for complete search history.

(56) References Cited

U.S. PATENT DOCUMENTS

| | | | |
|---|---|---|---|
| 4,842,441 A | | 6/1989 | Watkins |
| 4,881,361 A | * | 11/1989 | Dalton .................. A01D 34/82 180/19.3 |
| 5,217,653 A | * | 6/1993 | Mashinsky ............ B33Y 30/00 219/121.25 |
| 5,614,670 A | | 3/1997 | Nazarian et al. |

(Continued)

FOREIGN PATENT DOCUMENTS

| | | |
|---|---|---|
| CN | 202202237 U | 4/2012 |
| CN | 102953312 A | 3/2013 |
| WO | 2012087150 A1 | 6/2012 |

*Primary Examiner* — Nahida Sultana
(74) *Attorney, Agent, or Firm* — Ideation Law, PLLC; Joseph P. Kincart

(57) ABSTRACT

The present disclosure provides various aspects for mobile and automated processing utilizing additive manufacturing and the methods for their utilization. In some examples, the mobile additive manufacturing apparatus may perform surface treatments that support the building of walls. Other examples may involve the support of creating and repairing advanced roadways.

19 Claims, 16 Drawing Sheets

(56) References Cited

U.S. PATENT DOCUMENTS

| | | | |
|---|---|---|---|
| 6,299,934 B1 | 10/2001 | Manning | |
| 7,445,441 B2 * | 11/2008 | West | A61L 2/10 |
| | | | 425/174.4 |
| 9,255,364 B2 * | 2/2016 | Ichikawa | E01C 19/48 |
| 9,903,078 B2 * | 2/2018 | Ali | E01C 23/07 |
| 2006/0240183 A1 | 10/2006 | Pollard et al. | |
| 2008/0253834 A1 | 10/2008 | Colvard | |
| 2009/0000323 A1 * | 1/2009 | Walker | E01H 4/023 |
| | | | 62/235 |
| 2010/0041795 A1 | 2/2010 | Wilson | |
| 2011/0146111 A1 * | 6/2011 | Pender | E01H 4/023 |
| | | | 37/219 |
| 2013/0051913 A1 | 2/2013 | Eul | |
| 2013/0295338 A1 | 11/2013 | Keating et al. | |
| 2015/0048553 A1 | 2/2015 | Dietrich et al. | |

* cited by examiner

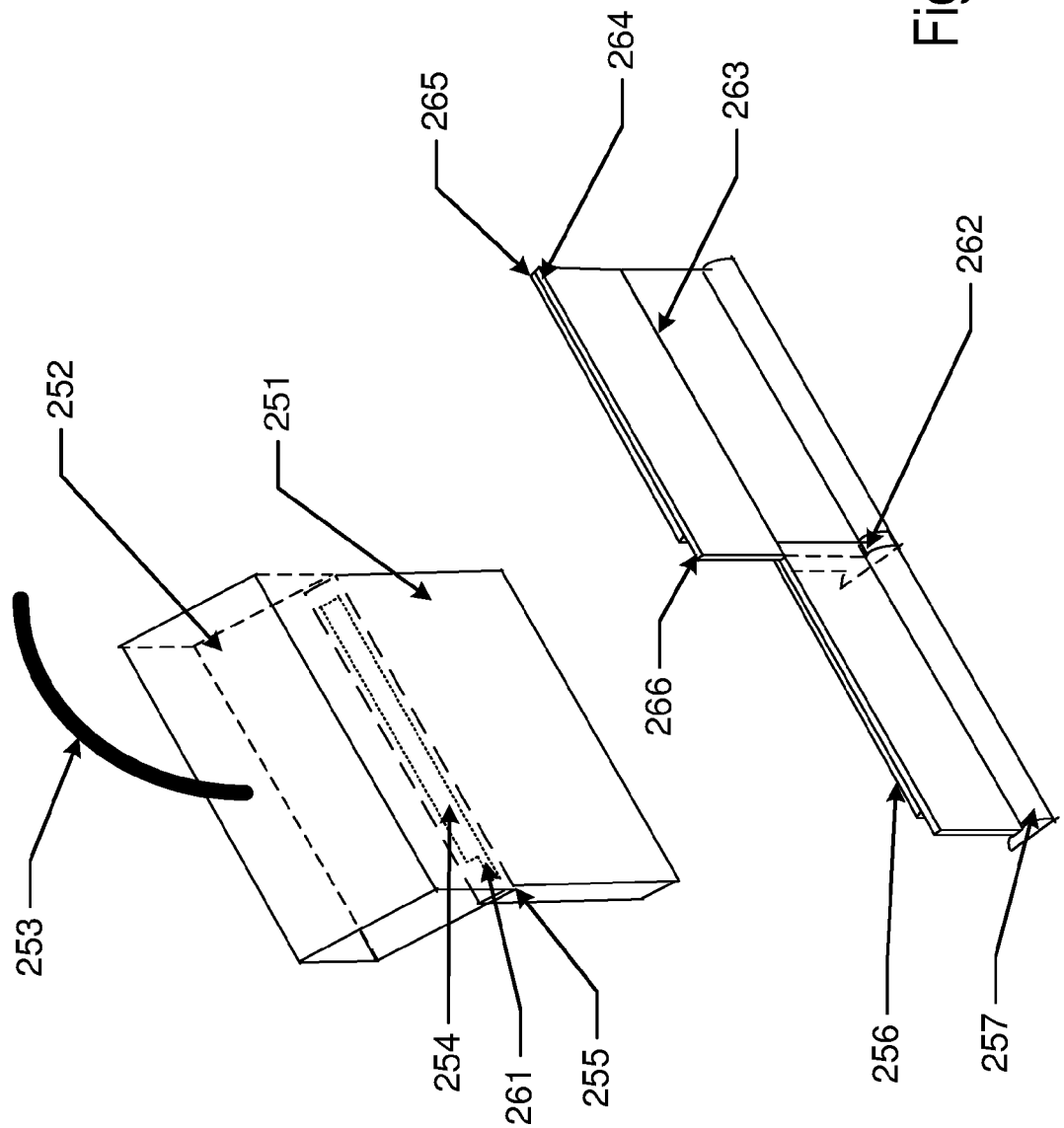

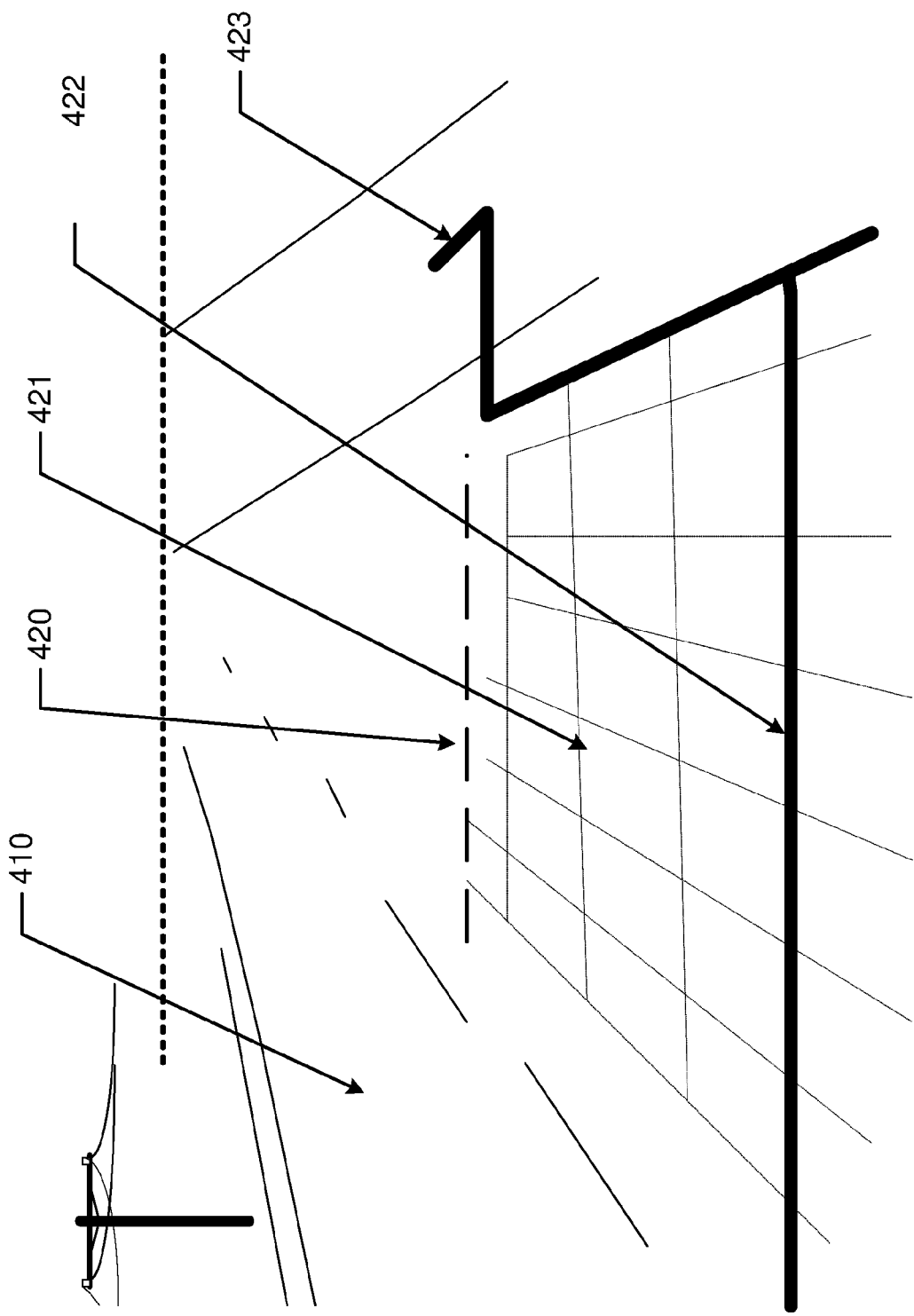

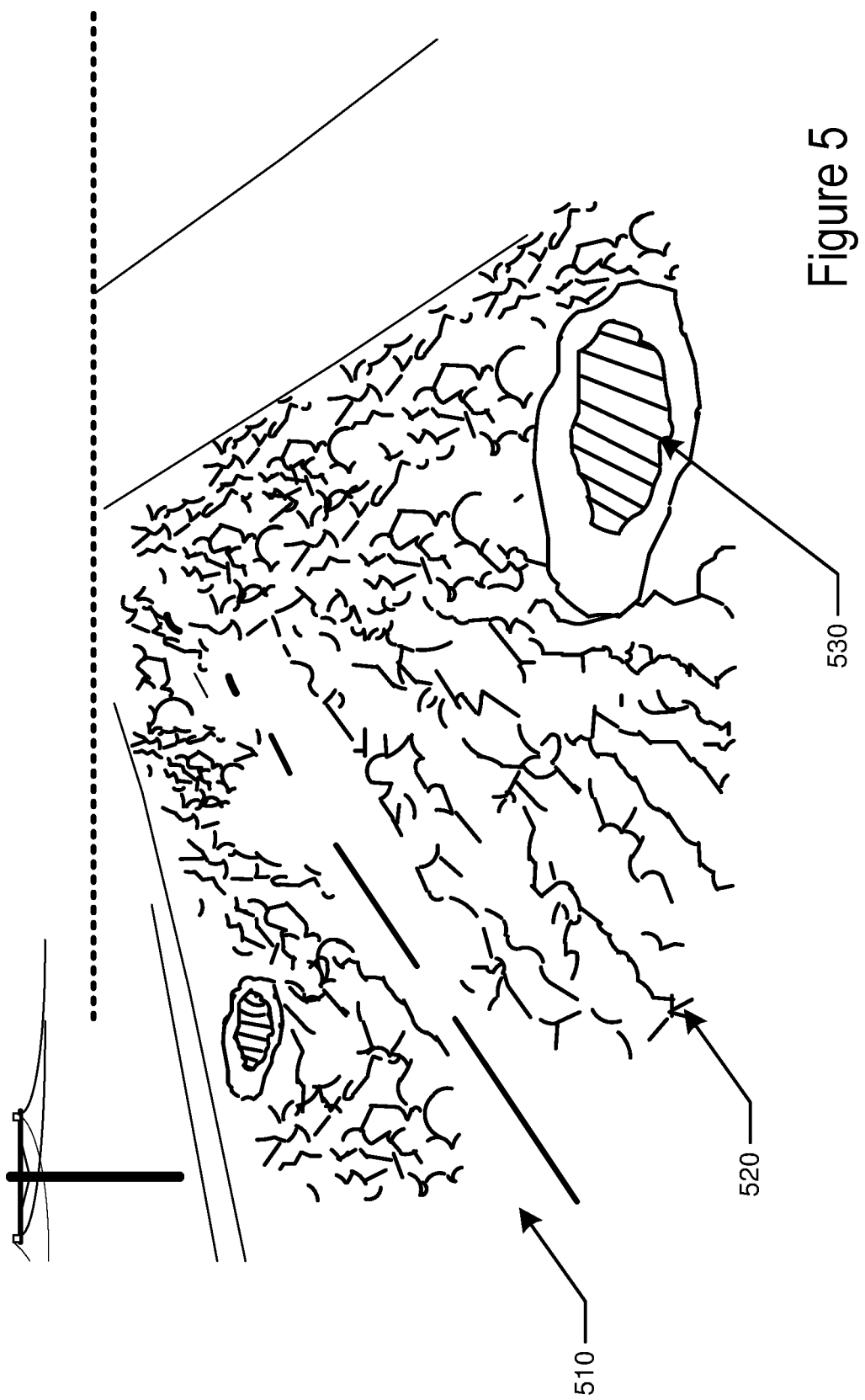

METHODS AND APPARATUS FOR MOBILE ADDITIVE MANUFACTURING OF ADVANCED STRUCTURES AND ROADWAYS

CROSS REFERENCE TO RELATED APPLICATION

This application claims priority to the U.S. Non-Provisional patent application Ser. No. 14/310,443, filed on Jun. 20, 2014 and entitled METHODS AND APPARATUS FOR MOBILE ADDITIVE MANUFACTURING as a Continuation in Part. The application Ser. No. 14/310,443 in turn claims the benefit of the U.S. Provisional Application Ser. 61/838,302 filed on Jun. 23, 2013. This application claims priority to the U.S. Non-Provisional patent application Ser. No. 14/310,556, filed on Jun. 20, 2014 and entitled METHODS AND APPARATUS FOR MOBILE ADDITIVE MANUFACTURING OF ADVANCED STRUCTURES AND ROADWAYS as a Continuation in Part. The contents of each are hereby incorporated by reference.

FIELD OF THE INVENTION

The present disclosure relates to methods and apparatus that support mobile additive material processing. Robotic and human controlled mobility may be combined with additive manufacturing techniques that "print" or additively deliver materials to specific locations over distances. The methods and apparatus may be applied to the productions of advanced building structures and roadways.

BACKGROUND OF THE INVENTION

A known class of approaches to material fabrication can be classified as additive manufacturing. Material in various forms, including solid, powder, gel, gas or liquid forms may be processed in such a manner to deposit or lock in material in a target location in space.

Numerous techniques may be utilized to perform additive manufacturing. In extrusion processes materials in wire or filament form are controlled by an extrusion head which may be moved above a work area. The use of multiple extrusion heads and extrusion material may allow for both permanent and temporary structures to be formed. By building the extruded material in layers or in regions complex shapes may be formed in three dimensions. However, the technology is limited by the dimensions of the work space— the ability of the head or heads to move in the two dimensions of a plane and also by the dimension of the ability of the head to move vertically relative to a planar support structure. There may be numerous variations on this form of additive manufacturing.

A different class of additive manufacturing may be classified as Stereolithography. In this class, a light or heat source is used to transform the material in space. In some Stereolithography implementations, the work support plane is submerged in a photoactive or thermo-active liquid and a laser or other light or heat source is rastered across a thin surface layer of the liquid between the support structure and the top level of the liquid. By translating the support structure down a layer, into the liquid the fluent nature of the liquid reforms a thin layer of new unreacted material over the work surface or the previously processed layer.

Versions of Stereolithography may also work with powder formed starting material. The powder may be shaped into a thin layer and then a spatially defined. Lasers may be used to transform portions of the layer into a solidified material. In other examples, other energy sources such as, for example, electron beams, may be used to transform the powder. Various materials including metals, insulators and plastics may be formed into three dimensional shapes by these processing techniques.

A different type of processing occurs when a print head is used to deposit material onto the powder. The deposit may chemically react with the powder or may be an adhesive that consolidates the powder into an adhered location. The prevalence of high resolution printing technology may make this type of additive manufacturing process cost effective.

The field is both established, with versions of additive manufacturing being practiced for decades; and emerging, with new techniques and materials being defined with rapidity. The technology may be currently limited by the dimensions of objects that may be produced and limits on size that are placed by the size of the additive manufacturing equipment. Accordingly, it may be desirable to develop methods and apparatus that may allow additive manufacturing techniques and apparatus to be independently mobile. It may also be desirable to apply the techniques in new manners to the fabrication of advanced building structures and roadways.

SUMMARY OF THE INVENTION

Accordingly, the present disclosure provides description for methods and apparatus that allow for mobile additive manufacturing and the application of these techniques to the production of advanced building structures and advanced roadways. In some examples, the mobile additive manufacturing apparatus make act in an independent or automated manner. The apparatus that performs the mobile additive manufacturing may be called an Addibot (ADDItive roBOT).

An important characteristic of additive manufacturing apparatus may be that material is added to a product in a controlled manner that is driven by a digital model that resides in a controller. Through the processing of the additive manufacturing apparatus the digital representation may be translated to a physical approximation of material placed in three dimensional space.

Accordingly in some examples disclosed in this disclosure, a mobile additive manufacturing apparatus which may be called an Addibot may be configured to comprise a drive system which may be operative to move the apparatus along a surface. In some examples the Addibot may function with no physical tether. In addition, the Addibot may comprise a navigation system which among other functions may determine the Addibot's current location and its current bearing or direction that it would travel in when caused to move or is travelling in if moving.

The Addibot may additionally comprise a controller capable of executing code which may perform an algorithmic function. The controller may also provide controlling signals to other elements of the Addibot. The Addibot may additionally comprise an additive manufacturing system to deposit a material or combination of materials in prescribed locations across the surface that the Addibot is on or will move to during its processing. The additive manufacturing system may add material to a surface based on a digital model that may be processed in one or more controllers that may be located in the Addibot. The origin of the digital model may be determined externally to the Addibot or alternatively may be determined by sensing or other processing of the Addibot, or may be a combination of external model definition combined with the data related to sensing apparatus within the Addibot. The systems that the Addibot has may be powered by a power system capable of providing power to operate at least the drive system, the navigation system, the control system and the additive manufacturing system of the Addibot. In some examples multiple power systems may be present in an Addibot.

The additive manufacturing system of an Addibot may include many different types and definitions capable of adding material based on a digital model in controlled fashion. In some examples, the additive manufacturing system may comprise a three dimensional ("3D") printing head. The printing head may add material to a surface in many standard manners including extrusion of a material by the printing head or ejection of material in liquid or solvated form.

In some examples, the 3d printing head may comprise an array of nozzles which individually eject liquid form droplets in response to an electronic control signal provided to the nozzle. In some examples, the liquid that may be process by the 3d printing head may comprise one or more of water, a water or aqueous solution, a hydrocarbon based solvent, an inorganic solvent or an emulsion of a combination of two or more of water, hydrocarbon or inorganic based solvents. Solutions may comprise a material solvated in one or more of the water, hydrocarbon or inorganic based solvents.

In another aspect, a dimension of time may be included wherein one or both of: a) a specified rate of extrusion and b) a specified order of extrusion is controlled in order to obtain a desired result. Embodiments may accordingly include a ratio of time over distance and rate of extrusion.

In some examples, the Addibot may also comprise a vision system. The vision system may be operant to create a digital model of the topography of a surface in a region proximate to the mobile additive manufacturing apparatus. The vision system may operate on or within the Addibot and use a variety of detection schemes for analyzing the surface and creating the model of the surface including light or laser based imaging techniques or other electromagnetic radiation based imaging including infrared, ultraviolet or other electromagnetic radiation sources. In some examples, the vision system may utilize sound based radiations to create a digital model of its surroundings which may include the surface in the region of the Addibot. In other examples, the Addibot may deploy a physical sensor to determine the topography of the surface in a region studied by the vision system. A controller located within the Addibot may initiate the operation of the vision system and may receive signals in response to the metrology that the vision system performs. In other examples, the Addibot may communicate with a vision system that is located external to itself or on another Addibot for example.

In some examples, the Addibot may also comprise a material storage system capable of storing at least a first material to be supplied to the additive manufacturing system. The stored material may include solids, powders, gels, liquids or gasses to mentions some non-limiting examples. In some examples, the material may be in wire forms or in some example may exist as physical solid entities which are placed by the additive manufacturing system. The material storage system may maintain a storage condition for the material by controlling an environmental condition. The condition that may be controlled may include one or more of temperature or pressure of the material.

In some examples, the Addibot may also comprise a surface preparation system. The surface preparation system may be capable of removing one or more of flaked surface material, dust, dirt and debris from the surface region in a region in advance of the additive manufacturing apparatus. Since the Addibot may move or when stationary the additive manufacturing system within the Addibot may move in a direction, the surface preparation system may be operant to process a region of the surface where the additive manufacturing system on its own or under the drive system of the Addibot may move to.

In some examples, the Addibot may also comprise a communication system that may be capable of transmitting signals outside the mobile additive manufacturing apparatus. In some examples users may use communications systems external to the Addibot in transmitting a control signal or control signals to the Addibot. The communication system may also be capable of receiving signals originating outside of the mobile additive manufacturing apparatus. In some examples, the signals transmitted or received may comprise one or more of radiofrequency signals, infrared signals, optical signals or sound based signals or emissions as non-limiting examples. In some examples the communication system may function to sense the environment of the mobile additive manufacturing apparatus. The sensing may occur in addition to signal transmission function. In some examples, there may be multiple communication and/or sensing systems within an Addibot.

In some examples, the power system of an Addibot may comprise a battery.

In some examples, the power system of an Addibot may comprise a combustion engine or other type of engine.

In some examples the power system of an Addibot may comprise an electrical wire that may be connected to an electrical power source that may reside external to the Addibot which may also be called a mobile additive manufacturing apparatus.

There may be numerous methods related to a mobile additive manufacturing apparatus. In some examples a user may transmit a signal to an Addibot which may include any of the types of examples of apparatus that have been described. The transmitted signal may cause the Addibot to next deposit a first layer of material on a surface utilizing systems of the Addibot. The Addibot may, in continued response to the initial signal, move from a first location to a second or different location. After moving, the Addibot may in further continued response to the initial signal deposit a second layer of material. The makeup of the first layer and second layer of material may be different in composition or physical aspects such as thickness or may be identical except in the aspect that it is located in a second location.

In some examples, the methods may additionally include a step to orient the apparatus for mobile additive manufacturing, which may be called an Addibot, in a spatial coordinate system.

In some examples, the methods may additionally include a step to perform a metrology process to measure the topography of a region of a surface. This may typically be in a region proximate to the Addibot or in a region that the Addibot will move to. In some examples additional steps in the method may include processing the result of the metrology process and using the result of the processing to control the additive manufacturing system of the Addibot.

In some examples the methods relating to processing by an Addibot may include the step of depositing a layer of material shaped by molding patterns. The molding patterns may be used to force molten material in some examples, or polymer precursors in some examples, into predefined shapes such as shapes consistent with building features including walls, blocks and the like. The placement of the molding patterns may be coordinated by an Addibot device which may be controlled by a controller implementing pattern directions communicated to the controller in digital form.

In some examples, a wall may be formed by the placement of molding patterns for a layer at a time. Thereafter, material may be filled within the deposit formed in the shape of the molding pattern to form a solidified form. A material which may be handled in a form consistent with filling a deposit of molded material, where the material may then be solidified by its own internal reactions or by external forces or interactions may be considered a solidifying material. Cement, asphalt, and polymer precursors may comprise some examples of solidifying materials. In some examples the molded patterns may have internal closed shapes within them, and when a material is filled within the deposit formed by the molding pattern it may not fill these internal closed shapes. In some other examples, numerous layers of molded material may be formed by lifting the Addibot from layer to layer before material is filled into the molded patterns.

In some examples, the molded patterns may have numerous internal regions defined. Some of the internal regions may be filled by materials to create a wall type structure. Other internal regions may be left unfilled, or may be filled with other materials such as electrical wires as a non-limiting example. In some examples, the molded patterns may be used to create novel and advanced roadways. A variety of patterns may form single layer structures that may form features to strengthen roadways. In other examples cavities or channels may be formed into the molded material through which wires or other forms of electrically conductive material may be placed.

The resulting structures may create an infrastructure for advanced roadways through which electrical signals may be communicated. Some examples may include power and charging electrical devices, transmitters of various kinds in roadway, and transmitters of various kinds alongside of roadway. Some transmitters may communicate via wired means and others may communicate at least in part by wireless means. Within a constructed roadway as described in this disclosure there may be devices to control or generate signaling information for location, signaling information relating to the status of the roadway or sensors within the roadway. In some examples, roadway systems may be configured to transmit data along the path of the roadway. In some examples the transmission along the roadway may comprise completely wireless communication in other examples a combination of wireless and wired, sometimes with portions of the path beneath the roadbed may occur. There may also be communication from systems to equipment in the vicinity of the roadway and to neighboring commercial and residential structures.

BRIEF DESCRIPTION OF THE DRAWINGS

The accompanying drawings, that are incorporated in and constitute a part of this specification, illustrate several examples of the invention and, together with the description, serve to explain the principles of the invention:

FIG. 2D illustrates a view of an alternative exemplary extrusion component and structures that may be formed by repeated use of the component.

FIG. 4A illustrates exemplary advanced roadway structure that may be formed by Addibots.

FIG. 5 illustrates an exemplary roadway with features requiring repair processing.

DETAILED DESCRIPTION OF PREFERRED EXAMPLES

The present disclosure relates to methods and apparatus for mobile automated additive manufacturing. As used herein, "mobile automated additive manufacturing" may include control of locomotion of an additive manufacturing apparatus over a surface free of tracks or rails.

Figure 1:
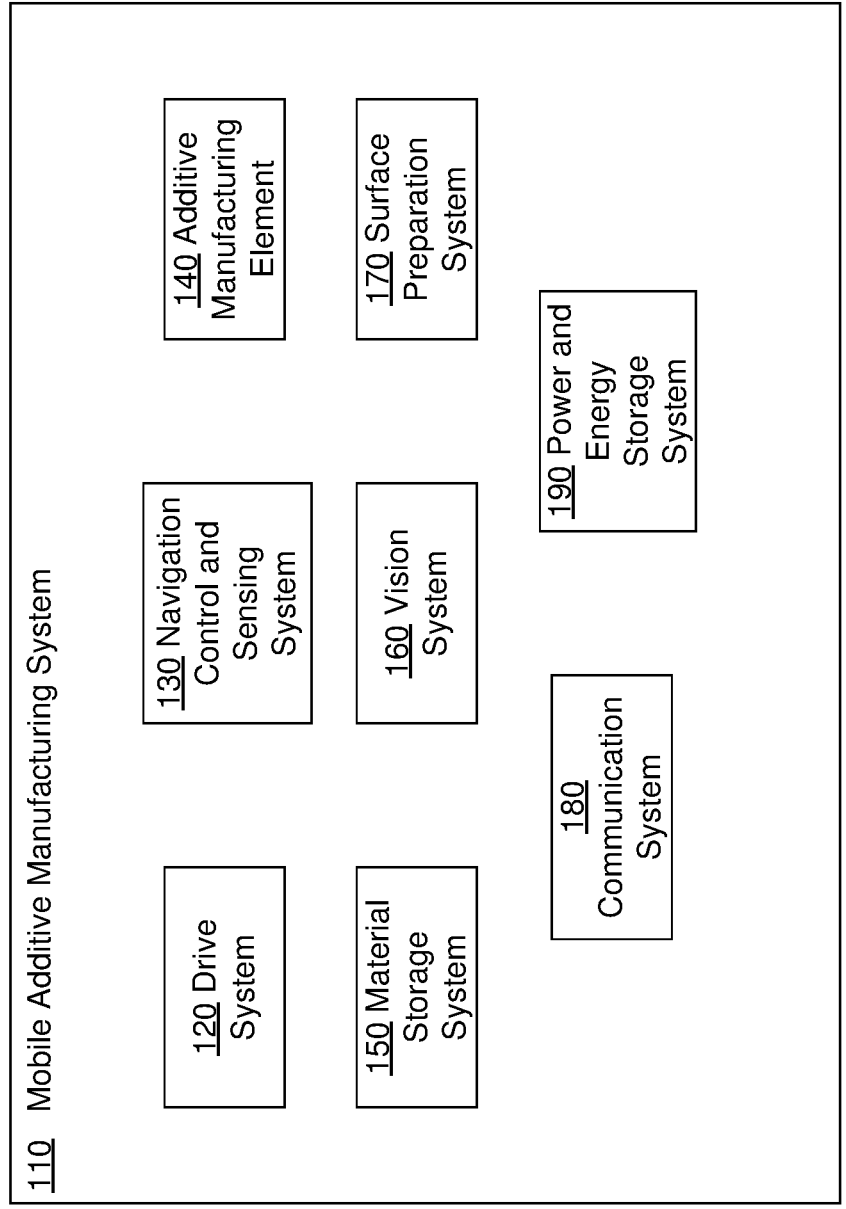
FIG. 1 illustrates a block diagram of the general components of a mobile automated additive manufacturing apparatus.

Referring to FIG. 1, 100, some elements of an exemplary mobile additive manufacturing system (110) may be found. The system may have a movement system 120 enabling transportation of the manufacturing system over a surface. This movement system may also be referred to as a drive system. The movement system 120 may function to move the apparatus on both flat and shaped or curved topography. The movement system 120 may function on wheels, balls, tracks or other means of conveyance known in the art. In some examples, the use of automotive or truck frames either with trailers or with modification directly to the frame itself may be used. The movement system 120 may incorporate a drive mechanism comprising an engine or motor that may act upon the conveyance elements such as wheels or may utilize transmissions and axles to drive the conveyance elements. Various forms of directional or steering control may be possible. In some examples, the differential control of multiple motors acting upon conveyance elements may allow for directional control. In other examples, the directional control may function by a steering system that moves the conveyance elements in ways other than in its drive sense.

The mobile additive manufacturing system 110 may include a Navigation, Control and Sensing system 130 that may function to determine a current location to a desired degree of accuracy as well as an orientation of the device at that location. Such information may be useful in regulating direction control through the navigation system and in determining other control variables such as speed. The sensing system may provide other environmental information to the control system such as temperature and humidity at the location and in some examples at a surface beneath the location of the system. In addition, the sensor and navigation elements may also function to provide awareness of obstacles in the environment of the mobile additive manufacturing apparatus. A separate vision, measurement and inspection system may be present in some examples (a following discussion discusses this in detail) and may interface with the control elements or sensing elements. The control elements may receive data in various forms and may process the data utilizing computational hardware and programming algorithms. The processing may produce control signals to engage the mobile additive manufacturing apparatus to produce an environmental change such as adding material of various forms to create three dimensional surface characteristics such as a flat surface, a surface of defined topography or a surface where defects of various types are affected with the addition of material. In other examples, the addition of material may be used to create an image or another functional aspect such as a slip resistive coating or a tread cleaning function as examples.

The navigation element may utilize various protocols to generate location awareness. For example, the element may utilize GPS technology. In other examples, a local transceiver network may provide telemetry local relative location awareness through the use of RF systems, or light based systems such as a laser based system This local system may function within an outdoor region or alternatively be set up to function within a building. Cell phone based telemetry, and other schemes such as seismic location detection may provide information for telemetry. In some examples, the navigation element may provide a first order telemetry to an accuracy required to control movement of the apparatus, for example. The vision system (to be discussed) or other sensing elements may provide a next higher accuracy for calibration of location. Location marks may be present upon or within the surface and a sensor such as a camera system, for example, may pick up the location marks to calibrate the navigation system and the control system. Various other reference elements such as physically defined lines, such as found on roads or parking lots may be a type of navigation control system. Still further examples may involve the embedding of conductive wires to create a navigation information system. A grid of such conductive wires may create a calibrated work floor with a good deal of accuracy. In still further examples, the surface to be acted on by the mobile additive manufacturing apparatus may be a temporary surface that may itself be moved. Sheets of a temporary material may function as the surface and these sheets as well may include coloration and/or physical elements such as embedded conductors to provide a telemetry signal for the navigation element.

The Navigation and control system 130 may function to define a path that the mobile additive manufacturing apparatus follows in its process. In other examples, the path itself may be figured into the design of a desired topography. For example, in some examples it may be necessary for the mobile additive manufacturing apparatus (Addibot) to travel along a road surface and perform additive manufacturing based on aspects that it measures or determines of the surface as it travels. In other examples, the shape of a feature to be deposited across a surface may involve the control of the navigation system to move the Addibot to a location where the additive manufacturing element can further control the additive process. In these cases, the path of the Addibot could be arbitrarily complex based on a model that it follows to generate an end result.

Referring now again to FIG. 1, an additive manufacturing element 140 may be represented. The various techniques known in the art may be included as an additive manufacturing element including, for example, extrusion heads, stereolithography processing heads and material printing heads. An altered version of stereolithography may occur by the application of thin films of liquid material upon the surface which is then subsequently processed to create hardened surfaces. If the unreacted material is removed a subsequent application of liquid reactant can begin to build the next layer.

The material printing heads may have a wide diversity in characteristics. Printing heads with very fine resolution may be utilized. In other examples larger volumes of material may be printed with heads that have gross resolution. As an example, a printing head may have rows of print heads that have an orifice size such that a roughly millimeter sized droplet may be formed. Such a droplet may have a volume of roughly 10-100,000 times that of a droplet from a 1:1000 resolution. The volume of a millimeter diameter droplet may have an estimated volume of about 0.4 microliters.

In some examples, the additive process can relate to an element such as a print head depositing droplets of material over the surface to build structure. In stereolithography, an energy source is used to convert the liquid to a solidified material, but in these other examples, the droplets of material may either react with the surface or solidify by other principals such as by cooling for example. Combinations of droplets of different material may also result in reactions that result in solidified material.

The additive manufacturing element may also function to add material that changes color or pattern or other physical properties in select regions. A version of this type of additive manufacturing may occur when powders are deposited in the additive process. The powder may create lines or other demarcations. In some of these examples, a subsequent sealing of the powder form may be deposited by another additive manufacturing process.

In some examples, the additive manufacturing element may be an energy source such as a laser, ion beam or the like. The energy source may be used to cause liquid material to solidify in defined regions. The liquid material may be added by the Addibot or be present by other means. As an example, an Addibot may ride upon a transparent surface that may sit above a liquid reservoir of relatively arbitrary size. An Addibot with a laser may ride upon the transparent surface and irradiate the surface layer of the reservoir in desired locations. After a layer is processed, the work material beneath the transparent surface may be moved away from the transparent surface by a layer thickness and the Addibot may again move around on the transparent surface irradiating through the surface to image polymerizable material beneath.

The various additive manufacturing elements that may be used in these manners comprise the art that is consistent with mobile automated additive manufacturing.

An additive manufacturing element 140 may be part of the mobile additive manufacturing system. There may be numerous types of additive manufacturing elements consistent with this type of system. For example, in some examples, the material to be added may be found in a liquid form either in its nascent form or in a processed form. The liquid material may be processed by droplet ejection printing schemes. Some printing elements may be comprised of MEMS jet printing elements. In other examples, the printing element may be composed of an array of valves that open and close to dispense controlled amounts of the liquid. In still further examples, a liquid stream may be controlled by the presence of mechanical shunts which do not allow a stream of the liquid to be released below the element. In fact any liquid control mechanism, typically deployed in an array of elements, which may allow for a spatial control over the dispensing of the material, may comprise an additive manufacturing element for liquids in a mobile additive manufacturing system In FIG. 1, a material storage system 150 may be found. As has been described there may be numerous types and forms of material that may be processed by an Addibot. In some examples, materials in filament form may be used; in other examples liquids of various kinds may be employed. And, in still further examples, solids such as powder form materials may be utilized. In each of these cases, there may be numerous material options within a particular kind. There may be standard ABS plastic filaments or other plastic filaments. In some examples, other fibers such as fiber class filaments may be utilized in composite processing such as with epoxy resin combinations with fiberglass filaments. In the liquid form a great diversity of materials may be used including resins, photoactive and thermo active materials. Other materials in the liquid form may be a solid at an ambient condition but may be processed by the additive manufacturing system at conditions that make the material liquid. The powder form examples may be thermo-active and photoactive materials or alternatively may be materials that in combination with other deposited materials cause a reaction to occur resulting in a deposited solid material. In the state of the art, metals, insulators and ceramics to name a few materials may be formed by the processing of powder form materials. In other examples, the powder deposited will remain in a powder form on the surface.

In the various materials examples that may be possible with an Addibot, the environmental storage conditions on the Addibot may be important. Accordingly the material storage system 150 may have controls over numerous environmental conditions such as the temperature of the material storage, the pressure, the ambient gasses or a vacuum condition and the humidity to mention some examples. Thus, the material storage system for an Addibot would have control systems for the important environmental conditions. The storage system would need to allow for the automated or non-automated replenishment or replacement of the material that is located in an Addibot. In some examples various combinations of multiple material storage systems may be present. For example, a powder storage system and an additive manufacturing element for powder forms may be combined with a liquid storage system and an additive manufacturing element for liquid forms upon the same Addibot system. In still further alternative, two different forms of material may be combined with different storage systems that feed a single additive manufacturing element that is designed to simultaneously process the two material types.

Other examples may have additive manufacturing elements to disperse solids. The element may extrude elements of material that may be gelled to allow for the material to be formed by the additive manufacturing head. The extrusion elements may also deposit small pieces of extruded material that is in a gelled or partially melted form. Lasers or other high energy sources may cut the small pieces from the extrusion print head as it is being extruded. In other examples, the material is not cut as it is formed into three dimensional shapes.

Solids may also be dispersed in powder forms. The powder may be carried in a solvent as an emulsion that may be dispersed in manners that liquids may be dispersed. In other examples, the powders may be controlled by valves or shunts as it is dropped or impelled onto the surface.

The various materials that are added to the surface may be further treated to form a solidified surface. In some cases materials may be treated with light or other energy to heat or otherwise react the materials to form a solidified result. In other cases a chemical reaction may be caused to occur by the addition of a second material. In such cases the additive manufacturing element may be comprised of control elements to disperse liquids and solids or multiple liquids. In addition, the system may include the elements to post process the material such as by thermal or photochemical action. These post processing elements may be located on the additive manufacturing element, or may be located in other portions of the system. In some examples, the post processing may also include processes to wash or clear the surface from materials that are not solidified, adhered or attached to the surface. These processes may include processing to remove solid, powder or liquid material remaining on the work surface such as vacuuming or sweeping. The removed material may be recycled into the material storage system or may be moved to a waste receptacle. In similar fashion the post processing steps to remove material may be performed by elements that are included on the additive manufacturing element or additionally be other elements that are included in the mobile additive manufacturing system.

The results of the various additive processes may be measured by various manners to verify the conformity of the result to a modeled surface topography. An inspection system or a vision system 160 may perform these measurements to control the results. In some examples, the surface may also be studied with a similar or identical metrology element to determine the presence of topography. Another way of looking at such a measurement before the additive manufacturing step may be to examine the surface for defects, cracks or fissures that may need to be processed to form a flat surface for example. Therefore, the vision system 160 may in fact occur multiple times in the system. A pre-measurement may be performed by a first measurement element and a post processing measurement may be performed by a second measurement element. There may be numerous manners to measure the surface topography. As an example, a light or laser based metrology system may scan the surface and analyze the angle of reflected or scattered light to determine topography. Similar scanning systems based on other incident energy like sound or electromagnetic signals outside the visible spectrum like infrared or UV radiation, for example, may be used.

A different type of metrology system may result from profilometry where an array of sensing elements may be pulled across the surface and be deflected by moving over changes in topography of the surface. An array of deflecting needles or stylus may be dragged over the surface. In an alternative example, a pressure sensitive surface may be pulled over the surface under study.

The surface that the mobile automated additive manufacturing system acts on may have movable defects that exist on it. This may be commonly classified as dust or dirt for example. An element for preparation of the surface 170 may be located in an Addibot. In some cases, the material may be removed by a sweeping or vacuuming process that moves the particles into a region that removes them from the surface. Other methods of removal, which may replace or supplement the sweeping or vacuuming, may include pressurized gas processing which may "blow" the surfaces clean. There may also be electrostatic processes which charge the particles with electric charges and subsequently attract them to charged plates which attract the particles away. A cleansing process may also comprise a solvent based cleaning process which may subsequently be removed in manners mentioned earlier, in a combination of the Addibot techniques. A first Addibot may function to pretreat a surface in a variety of manners while a second Addibot performs a topography altering additive manufacturing process.

Another element, a communication system 180, of the mobile additive manufacturing system may be found referring to FIG. 1. In general, Addibots may be used in combinations to perform functions. To effectively perform their function it may be important that the Addibots may be able to communicate with each other. The communication system may also be useful for communication between the Addibot and a fixed communication system. The fixed communication system may be useful for communicating various data to the Addibot as well as receiving data transmissions from the Addibot. The data transferred to the Addibot may include programming software or environmental target files or the data may include environmental data such as mapping data or topological data as examples. The communication may be carried by RF transmission protocols of various kinds including cellular protocols, Bluetooth protocols and other RF communication protocols. The communication may also utilize other means of data transfer including transmissions of other electromagnetic frequencies such as infrared and optical transmissions. Sound waves may be useful for both communication and spatial mapping of the environment of the Addibot. In some examples the Addibot may be tethered to at least a communication wire that may be useful for data transmission.

Another form of communication may relate to visual based information conveyed by the Addibot body itself. In some examples, the Addibot body may include a display screen to communicate information to the surroundings in the form of graphic or visual data. As an example, the display can warn people in the environment of the Addibot as to the function that the Addibot is performing and when and to where it may move. Audio signaling may comprise part of the communication system in addition. As well, the Addibot may be configured with a light system that can project visual signals such as laser patterns, for example.

The communication system may be useful to allow external operators to provide direction to the Addibot. The directions may include the control of navigation in both a real time and a projective sense. Users may utilize the communication system to provide activation and deactivation signals. Numerous other functional control aspects may be communicated to control operation of the Addibot other than just the transfer of software programs including for example activation and control of the various subsystems.

A Power and Energy storage element 190 may be found within the mobile additive manufacturing system. In some examples, an Addibot will be tethered with a wire. The wire may be used for a number of purposes including providing power to the Addibot drive system or to an energy storage system within the Addibot. In many examples, the Addibot will operate in a wireless configuration, and therefore, will contain its own power system in the mobile platform. Standard combustion engines and hydrocarbon fuels may comprise a power system along with a generator driven by the engine to charge batteries as an electric charging system. In other examples, a battery powered system may power both the drive system with electric motors as well as the electronics and other systems. The battery storage system may be recharged during periods of non-use and the components of such a recharging system may comprise portions of the power and energy storage element. In some examples where the Addibot operates in an automated fashion, the recharging of the energy storage element may also occur in an autonomous fashion whether it is recharging electrically or obtaining additional fuel stores.

Exemplary Structure of an Addibot

There may be numerous manners to configure the novel mobile additive manufacturing system that has been described. In the following examples, non-limiting examples are provided as examples of the different manners that the Addibot apparatus type may be utilized. In particular, in the next example related to FIG. 2A, 200 reference and description will be made to an Addibot that is configured for Ice Resurfacing. The additive manufacturing functions of such an Addibot may provide a good example for the various systems and components in some Addibots. The example is provide to give a perspective in this disclosure of supportive systems that may be present for other types of exemplary Addibots such as for wall building and roadway construction and repair as non-limiting examples.

Figure 2A:
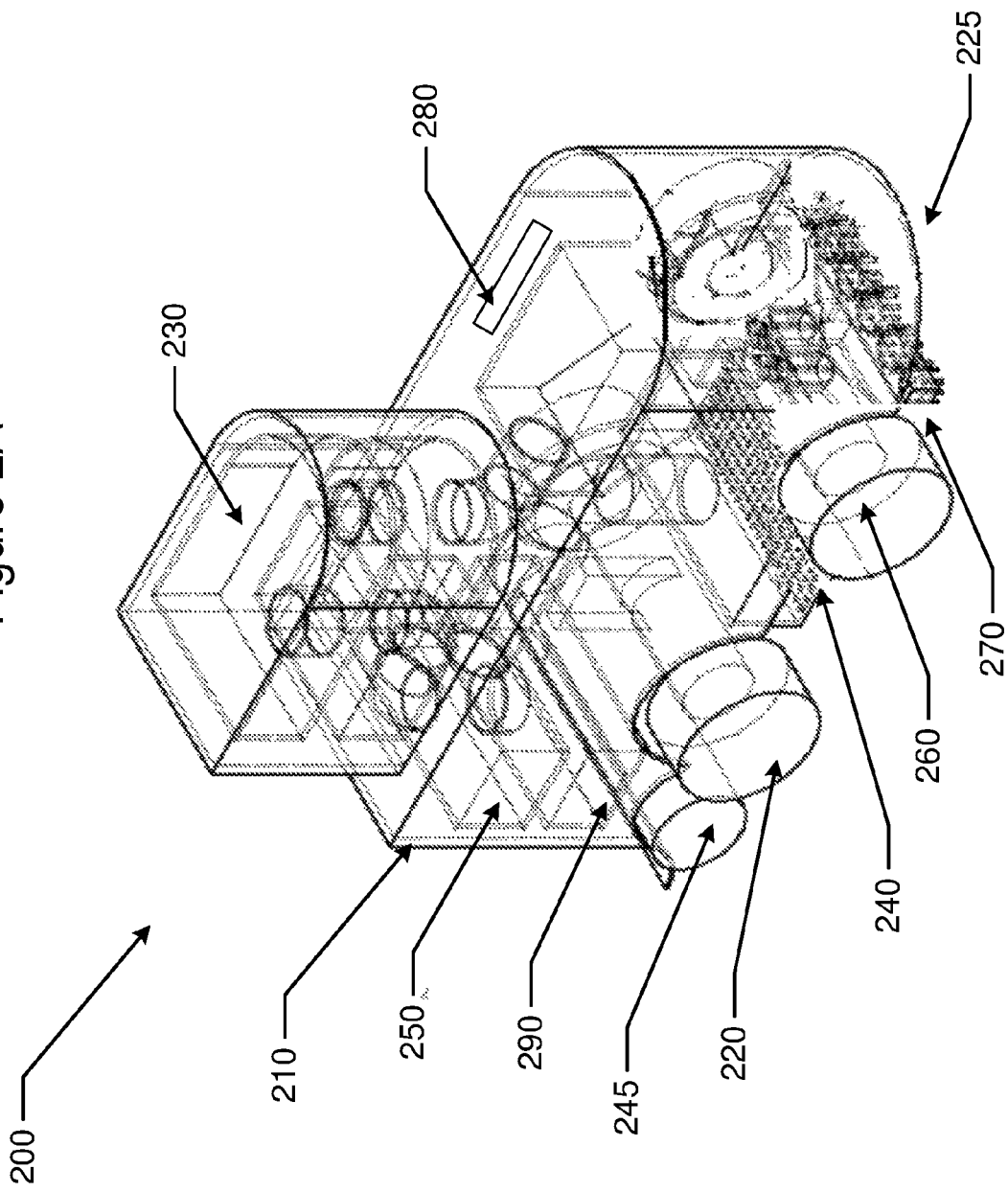
FIG. 2A illustrates a perspective view of an exemplary Addibot that may be useful for Additive Manufacturing Surface Treatment.

Referring to FIG. 2A, 200 an example of an Addibot configured for Ice Resurfacing may be found. The chassis 210 of the Addibot may contain and support the systems of the Addibot in a mobile and autonomous manner.

The drive system 220, and drive flexible wheel 225 of this example may be exhibited. The depiction provides an example of one possible drive system using three wheels. An example using 4 or a different number of wheels may also be within the scope of the inventive art herein. The drive system may be constructed, though, in a manner in which it does not interact with the other Addibot systems, for example, the vision system or the additive manufacturing element system. Depending on how the wheels of the drive system 200 are powered, they may also be part of the navigation, control and sensing system. Based on the input from the vision system (as a part of the navigation control and sensing system) the wheels may direct the Addibot to its desired path, in a fashion that is either autonomous or predetermined, depending on the orientation and number of the wheels.

A sensing element 230 may be depicted. This element may be used to perform functions necessary in the navigation, control and sensing system for this example. The navigation functions could be performed through GPS, an element grid, or other manners as has been described relating Navigation, Control and Sensing system 130 of FIG. 1.

An additive manufacturing element 240, and a secondary additive manufacturing element 245 for this example may be shown. The additive manufacturing element 240, for this example, may be a material printing head, as described in reference to the additive manufacturing element of FIG. 1, which may dispense water droplets of a controlled size, as well as a controlled temperature (which may be controlled by the material storage systems). This element may function to execute a precise additive process of the material, based on input from the vision system. Another element, in this example, the secondary additive manufacturing element 245 may be a roller or other type of distribution apparatus that spreads or smoothens to a degree, material that was added to the surface.

Elements of a material storage system 250 of this example are shown. These components may comprise various elements that may be necessary for material storage within an Addibot. There may be numerous alternative designs and orientations of components that may be consistent with the function of an Addibot. For this example, it may be important to include a surface material collection element which may be in part be filled from material outputted by the surface preparation system. A temperature controlled portion of the surface material processing element may be used to melt collected ice. Filtration or screening components may be used to filter out any undesired particles that may be collected in during the process of the Addibot. A primary material reservoir where water or water based mixtures may be contained, may be filled by an operator of the Addibot apparatus. Recirculation of melted ice collected during the surface preparation may also be directed to the primary reservoir. An environmentally controlled secondary material reservoir may also be used to keep water or water mixtures at a different storage condition than that used in the primary storage location, such as the temperature, pressure or other characteristic of the material. The filter system used in the surface material processing element could be any combination of ionizing plates, sieves, or other common filtration devices. These devices may be necessary for removing particles that may contaminate or otherwise interfere with the correct operation of the Addibot.

A vision system 260 for this example may be depicted as shown. This element may use a variety of methods such as those described in reference to vision system 160 of FIG. 1. These may include a laser scanner, sensitive extruding pins or brushes, or such components as may allow for inspection of the surface to be process or for determination of the topography of the surface. Alternative orientations may be possible including for example an orientation where a vision system may be placed behind the additive manufacturing element to perform a post-inspection of the surface, after the material has been applied. Among other purposes, the inspection may be used to verify the results of the addition process and to see if more or less material may need to be added.

A surface preparation system 270 for this example may be observed. In this example, it may be necessary to remove ice particles, snow, dust, debris or dirt from the ice surface before it may impede the accuracy of the vision system in processing the surface topography. The surface preparation system 270 shown in FIG. 2A may include a brushing system, a vacuum system, and a scraping system or a combination of these. These systems may be used to remove undesired particles from the surface. Other particle removal systems, including ionizing plates, a sweeping broom, or other brush based devices, other types of vacuums or suction devices; high pressure gas treatments to blow surface debris into a collection region, among other systems may also be usable for this example of an Addibot.

A communication system element 280 for this example may be seen. This element may be used to carry out communication processes, either between other Addibots or an external user. These tasks may be carried out in manners consistent with methods described in reference to the communication system 180 of FIG. 1.

A power and energy storage system 290 may be depicted. This element may be a battery to power the example's electrical systems and motors, or a combustion engine to power the drive system which may also charge a battery system as non-limiting examples. The power system may provide mechanical energy to the drive system or may provide electrical energy to the drive system which may power engines that comprise portions of the drive system. Electrical energy from generators connected to combustion engines or from battery sources may be used to power substantially all of the electronic systems utilized throughout an Addibot. Other energy storage sources such as compressed air may also comprise acceptable solutions for energizing the operations of an Addibot.

Material Extrusion

Figure 2C:
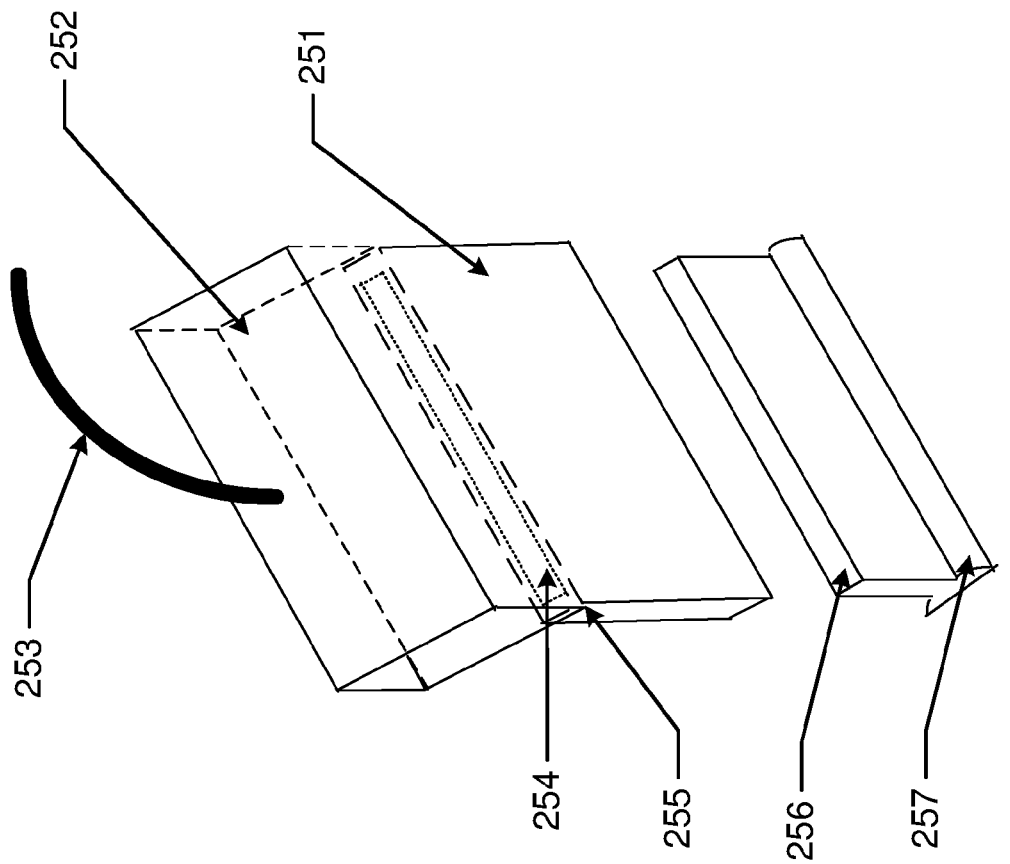
FIG. 2C illustrates a view of an alternative exemplary extrusion component that may be useful in creating molded extruded features.
Figure 2B:
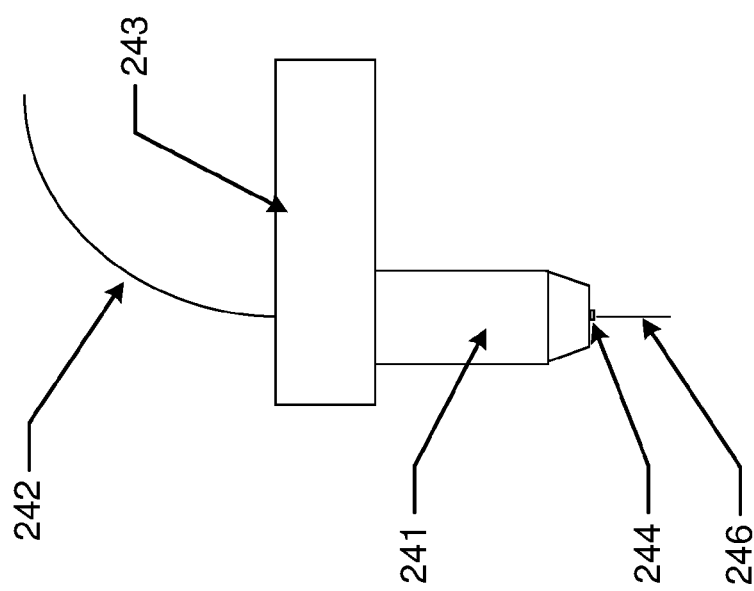
FIG. 2B illustrates a view of an exemplary extrusion component.

Referring to FIG. 2B, an exemplary material extrusion device may be found. A heated extrusion head 241 may heat extrusion material 242. Some examples of extrusion material may include ABS, PLA and other plastic materials that have relatively low melting temperatures. A feeding apparatus 243 may be used to feed extrusion material 242 into the heated extrusion head 241. Molten or semi-molten material may be extruded through an extrusion head 244 resulting in narrow melted material 246 that may be formed upon a surface.

The extrusion of material may be performed in novel manners where the material may be extruded from a mold type shape where two faces are used to contain the molten material in defined shapes. There may be numerous types of shapes that may be formed. Referring to FIG. 2C, a basic example of an extrusion apparatus based upon parallel plates is demonstrated. In some examples, the plates may be coated with materials that prevent the adherence of the extrusion material upon the surface. Examples of the coating may include non-stick Teflon based materials as well as non-stick ceramic materials as non-limiting examples. In some examples a wire form of the extrusion material 253 may be fed into the molding apparatus by a feeder 252. The region of the feeder 252 may be temperature controlled, and at an elevated temperature to melt or partially melt the extrusion material 253. A rectangular extrusion region 254 may be formed by plates 255 of coated material in some examples. The plates 255 may be heated by a heating device 251. The heating device 251 may be a resistive heater, coil heater or other device capable of heating the region during the extrusion of the extrusion material 253. The region at 251 may be kept at a different temperature than 252 to allow for molten material to be forced onto a surface through the rectangular extrusion region 254. The resulting extruded material may form a surface bonding region 257 which may be larger than the rectangular extrusion region 254 that the material was extruded from. As one moves away from the surface the extruded material 256 may assume a shape defined by the rectangular extrusion region 254.

There may be numerous manners to extrude material in the device illustrated in FIG. 2C. In some examples, the feeding of extrusion material 253 may force the extrusion. In other examples pistons may force molten material into the extrusion device. In still further examples, pressurized fluids or gasses may be used to force molten material out of a region where it is melted and into a molding form. In some examples, complicated molding forms may be formed from coated plates such as in the illustrative device in FIG. 2C. In some examples, versions of the molding form may be completed where the plates have the ability to be moved relative to each other. In some examples, a wire form material will be introduced into a melting region, after a sufficient time in the melting region, a control signal may cause pressurized gas to push the molten material into the form. The form or molding form may contain the molten material to a shape, and thereafter, as the molding form may be maintained at a lower temperature the material may slowly solidify in the shape of the molding form. In some examples, one or more of the molding plates may be moved away from another releasing the solidified material in place. The mold or form may then be moved upwards from the surface and in the process of moving release the formed molded material.

Referring to FIG. 2D, the exemplary formation of structures by the repeated processing of extrusion of molten material in molding forms may be depicted. The details of the molding form may involve more complicated features 261 than have been depicted such as end plates that may be moved to allow for overlap with previously formed structures. In FIG. 2D the result of three extrusion processes may be depicted with seals between the process steps such as 262 and 263. At 262 vertical sides may be overlapped and joined in various manners. In a non-limiting example, each of the sides may have overlapping features that repeat with additional processing. For example an end overlapping feature 266, a top overlapping feature defined by edge 265 and recessed edge 264. The features and shapes are illustrated as non-limiting examples of how the extrusion devices may form various structures.

Figure 3A:
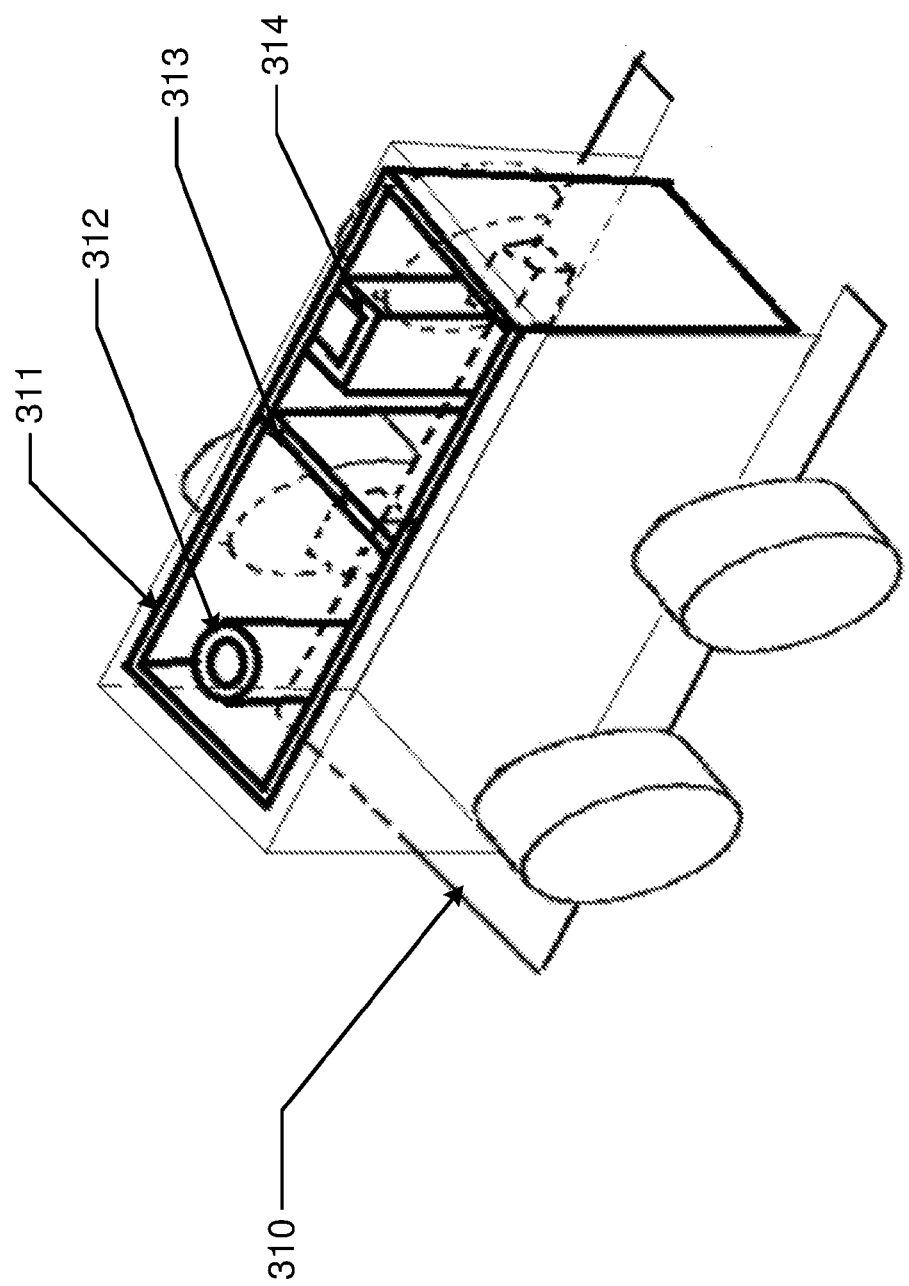
FIG. 3A illustrates a perspective view of a portion of an Addibot that contains exemplary molding components in an exemplary shape for wall building.

Exemplary Extrusion Components for Structure Formation in Mobile Automated Additive Manufacturing Extrusion devices may be formed in various shapes consistent with the processing needs has have been described. Referring to FIG. 3A, a portion of an Addibot may be observed where a molding form portion of the Addibot may be depicted in isolation. In the example, a portion of the supporting chassis 310 may be attached to the portions of the Addibot used to control movements of the device. The chassis may have connections to a molding device. The top of the molding device has been excluded in FIG. 3A to allow for an illustration of a relatively complicated mold form as shown. Features such as straight runs 311 and internal cylinders 312, internal straight runs 313 and internal channels 314 may be observed in the mold form. While the particular design of the mold form is shown as an example, it may be apparent that many alterations in design may be easily achieved; and in fact versions of the molding apparatus may be defined which may have their feature shape changed. Referring again to the exemplary mold form design in FIG. 3A it may be apparent that the shape of an extruded piece defined by the form may create an exemplary shape that may be filled with other materials such as concrete, plaster, mud and other materials consistent with wall design. In some examples, features may be defined which mimic the role and shape of studs in walls, where the walls may not be completely filled. The channel and cylinder type features may be useful for creating gaps and channels in solidified walls that may in an example be used to route wires, conduits, ducts and the like.

Figure 3B:
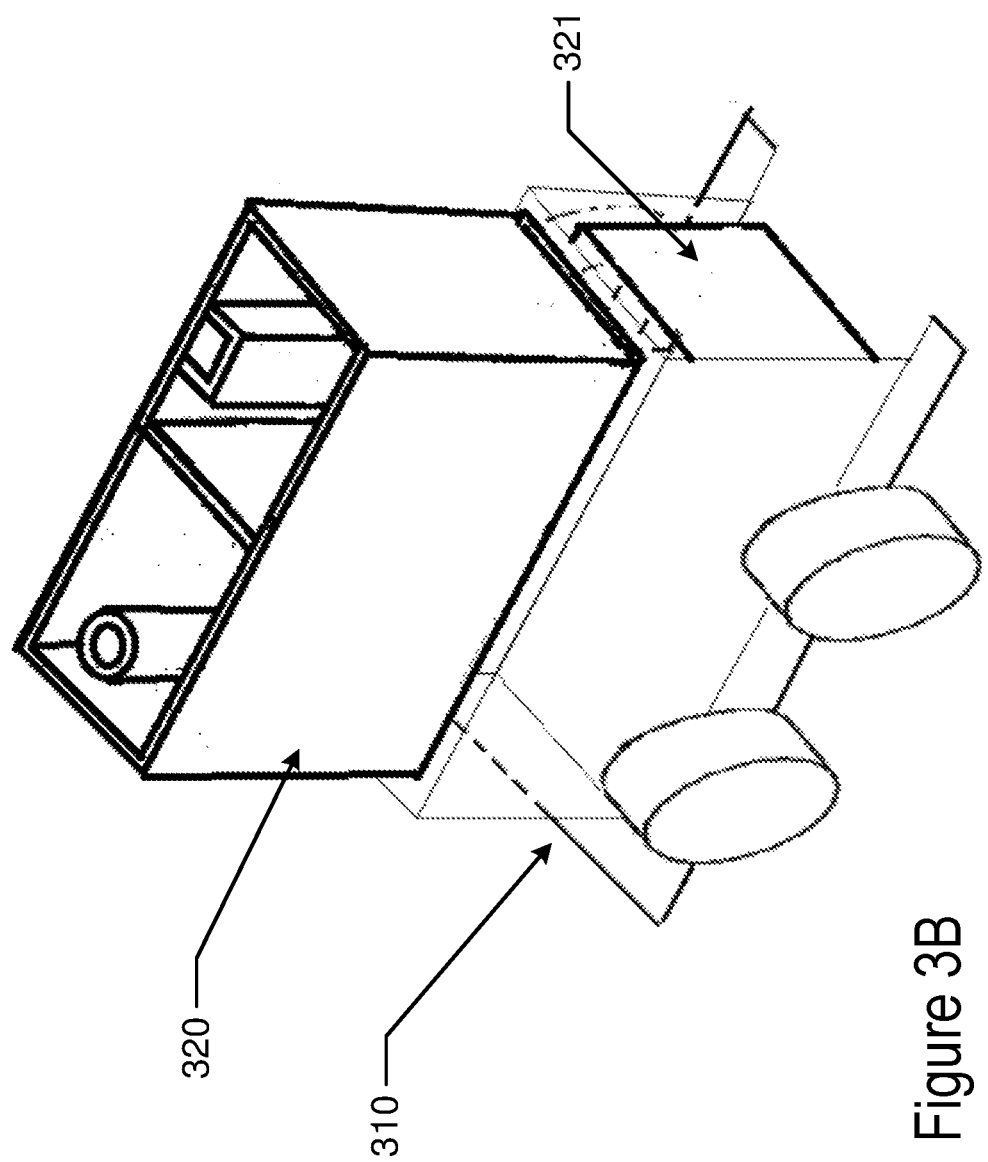
FIG. 3B illustrates a perspective view of the portion of an Addibot illustrated in FIG. 3A wherein the molding component is illustrated in a position after molding.

Referring to FIG. 3B, the exemplary Addibot with molding feature 320 for additive manufacturing may be shown in a position after an initial structure has been formed by extrusion. The molding feature 320 may be lifted by various mechanisms within the body of the Addibot. As mentioned previously, the molding features 320 may have plates that may be movable relative to each other. In some examples, after molten material is extruded into the mold and cooled to solidify the material, the molding feature 320 may be lifted so that it resides fully above the solidified structure 321 that may be formed according to the various types of methods described. The lifting mechanism may be supported upon the supporting chassis 310 of the Addibot.

Figure 3C:
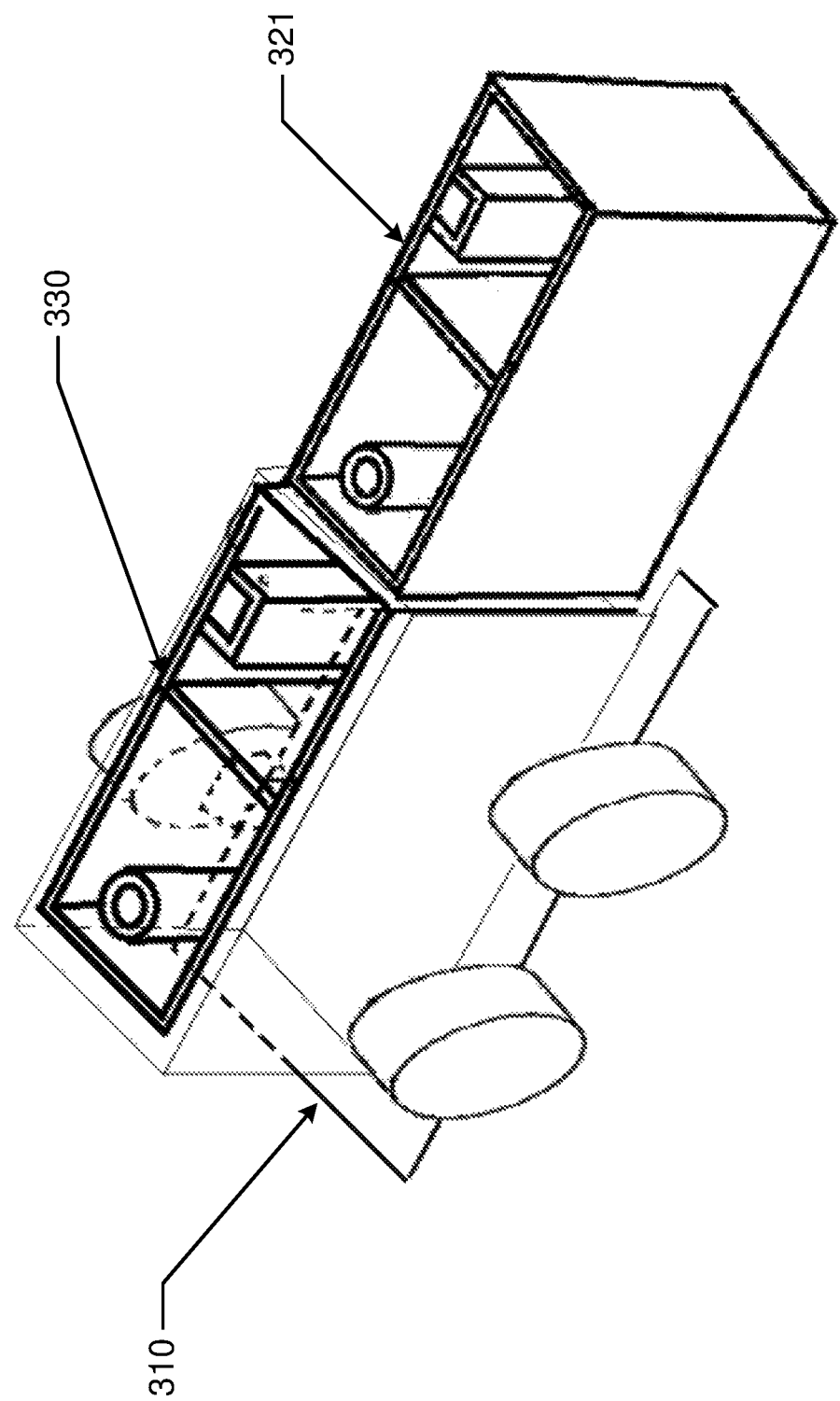
FIG. 3C illustrates a continued progression of an exemplary Addibot molding component in use to create wall structures.

Referring to FIG. 3C, the exemplary Addibot may move to a next processing position 330. By moving, the previously formed solidified structure 321 is now exposed. The movement of the Addibot from one location to a next location may be controlled by a digital model that may reside in a controller in the Addibot. One aspect of an Addibot may be that a digital model may be made to define a large structure that will be manufactured by an Addibot or a team of Addibots. In the example of FIG. 3C the structure being created may represent a wall being built. The wall may be built of extruded material. In some examples a single level of extruded structures may be filled with a material to form a fortified wall. In some examples, the structures may be filled with concrete, macadam, plaster, polymer, fluids or other materials. A version of an Addibot may be used to extrude these filling materials into the structures. In some examples, the extruded material structures may be formed in such a manner that an Addibot may ride at a second level upon the first level structure that was formed. In some examples, a series of levels may be formed before the structure are filled with fortifying material. There may be various supporting equipment that may aid in the processing of walls and other structures in this manner, such as lifts, elevators, movable scaffolds and the like.

Advanced Roadway Construction with Addibots

Examples of structure building with extrusion components within an Addibot have been described in the recent section. Different versions of extrusion components may be used to construct advanced roadways as well. Referring to FIG. 4A, some features that may be produced by an Addibot configured to support roadway construction may be observed. A roadway 410 may be formed in the various standard manners that such surfaces are constructed. There may be an interface 420, where a roadway according to the present disclosure has an advanced formed base with a filled bed material. Thereafter, Addibots may extrude various structural features. As an example, some roadway designs require the possibility for a roadway to expand under heat with expansion joints or other expansion elements. In some examples, an Addibot may extrude a feature at a location along the roadway surface. The location of the feature may be present in a model of the roadway that exists in Addibots and controlling apparatus for an Addibot or combinations of Addibots. The extruded feature may, as an example, be a channel that is formed at the full height or nearly the full height of the roadway bed when the roadway is completed. In some examples, the channel may be filled with a material. In some examples the material filling the channel may be a sealing material that may flexibly deform under thermal load and various pressures and forces from both the roadway and eventual traffic along the roadway. In some examples, the material filled into the channel may be a material such as a salt that will dissolve under the action of water to expose a well-controlled gap in the roadway.

Addibots may be used to extrude supporting meshes 421 of various kinds, shapes and designs. In some examples an extrusion pattern may be a cross-hatch pattern. A cross-hatch pattern according to this disclosure is a pattern where two or more features of the pattern approximate intersecting lines. In other examples a unit cell pattern, where a unit cell pattern means a pattern where portions of the pattern are repeated, a beehive pattern or various other patterns that could be useful in supporting a roadbed under the various stresses that it is exposed to. In some examples, the extruded material may be a composite of molten material with embedded fibers, nanofibers, nanotubes and other materials which may increase strength, flexibility, ability to stretch and other material characteristics that may be desirable for a supporting material which may be embedded in a roadbed. In some examples, the bed of the roadway may be comprised of asphalt of a given thickness. As an example, consider a bed of 6 inch thickness asphalt. In some examples, the extruded supporting material may be a full six inch thickness, a portion of the six inches, or in some examples, the roadway may be formed in multiple levels each one having another extruded layer. In some examples, the extruded material may be formulated with supporting material embedded within where the molten material may be chosen to fully or partially mix into the hot asphalt as it is laid. A partial melt of the material may leave a strengthening pattern of fibers, nanotubes and the like within the roadway yet not create significant gaps within the roadway bed.

Another feature that may be added to the roadway surface may be a channel 422 that may be used to embed materials such as conductive material within a roadway. There may be numerous uses for embedded conductive material including sensing of various kind, communication interface through wireless means and communication routing along the roadway. As shown the channel 422 may route electrical connections along a roadway and may also route them to the side of the roadway at side channel 423. The extrusion techniques and apparatus may be used to form channels as portions of the deposited material. The channel may contain electrically conductive material with other materials as well. In some examples, the channel may contain communication devices such as optical fiber. The optical fiber may route signals along the roadway as well as to devices along or embedded within the roadway. The channel may be filed with insulating materials of various kinds and in some examples, portions of the channel may also may be topped with structures that act as antenna. In some other examples, the channel may be layered with different layers of materials, some of the layer may contain and insulate metallic wires, optical fiber and other such active components.

Figure 4B:
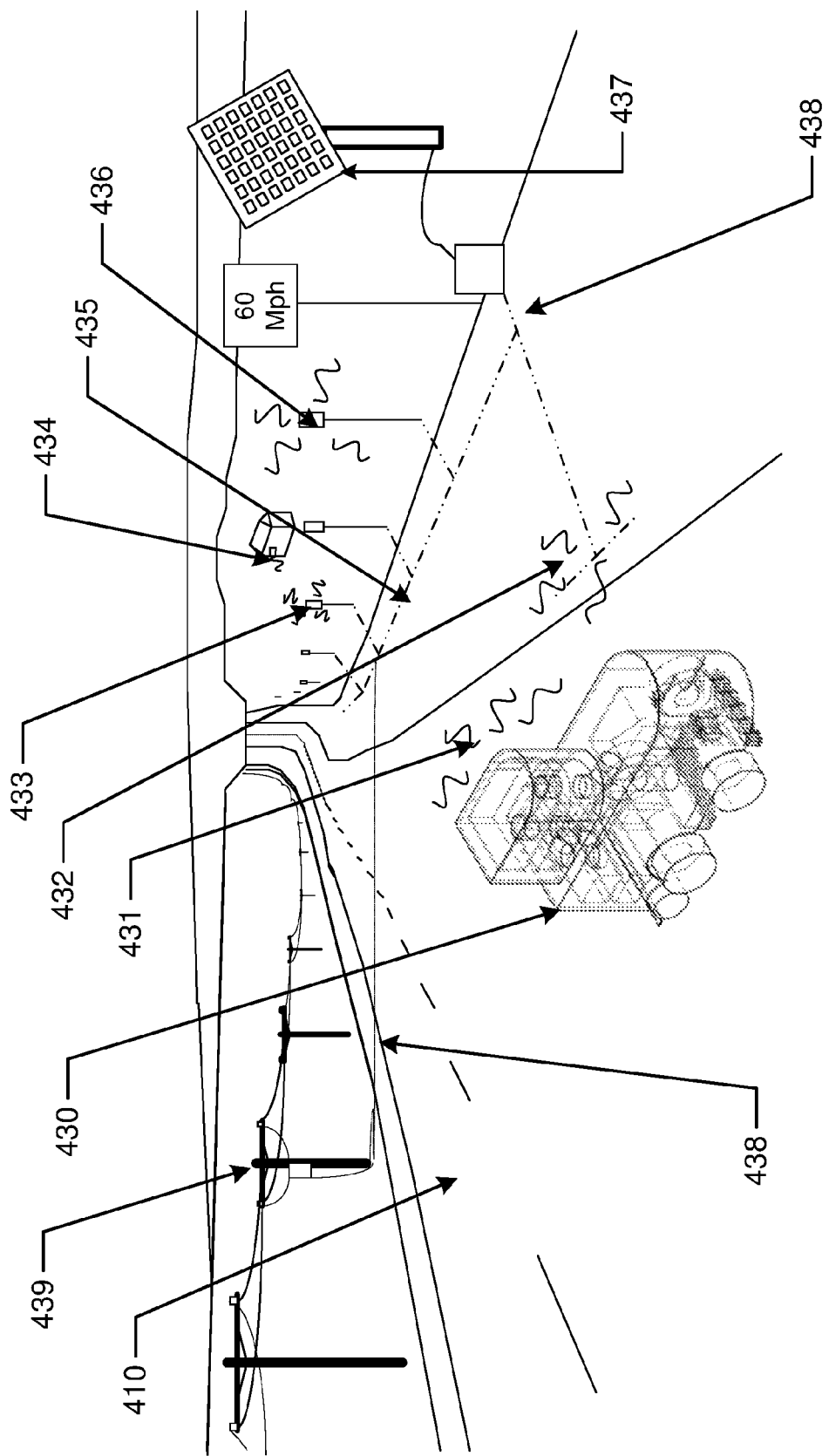
FIG. 4B illustrates an exemplary Addibot in concert with features of an advanced roadway.

Referring to FIG. 4B, an advanced roadway 410 in conjunction with an Addibot 430 is depicted. In some examples, an advanced roadway may have been formed with use of Addibots in a manner as described. The roadway may be formed with embedded sensors, antennas or other devices for facilitating communication 431 between an Addibot 430 and the advanced roadway 410. Within the advanced roadway 410 may be communication devices 432 that may be buried within the roadway, the shoulder or the side of the roadway or be upon these locations. In some examples, there may be communication devices on roadway poles, signs and the like. The communication 431 may comprise wireless communication and may involve radio frequency, infrared frequency, optical frequency or other forms of wireless communication. In some examples, the advanced roadway may be formed with embedded fibers 435 formed of conductive materials or optical fiber. The embedded fibers 435 may also be considered wires. There may be connection of wires 438 to power sources along the roadway. The power sources may be standalone sources such as solar panels 437 or be connected to power transmission grids 439.

Communication signals may be routed through the advanced roadway and shoulders of roadways as depicted in FIG. 4B. In some examples, the communication signals may be routed out of the roadway to a wireless transmitter 433 located along the roadway. In some examples, signals may be transmitted from one wireless transmitter 433 to another transmitter 436. A combination of transmission through conduits in the roadbed and to roadside transmitters may be used to transmit signals of various kinds. In some examples the signals may relate to the movement of traffic along the roadway. The signals may also relate to conditions along the roadway as detected by sensors or traffic itself. In other examples the signals may involve communication signals unrelated to the traffic and may be standard communications that are routed along roadways. The signals from the roadside communication transmitters such as wireless transmitter 433 may be routed to neighboring structures 434 such as residences or businesses. The transmissions in some examples may comprise standard internet communication transmissions, or in other examples the signals may relate to traffic flow along the roadway. Autonomous vehicles may use the various communications and sensor pathways as part of technological support of the traffic flow. Signals from traffic may be routed from vehicle to vehicle with the support of the roadway communication system. And, signals from traffic may be routed along wireless pathways to internet connections to central controllers for traffic flow that may be located at off road sites such as neighboring structures 434. The internet connections may be used to transmit signals from and to remote control systems.

In an example related to FIG. 4B, the communication and control systems may be used to control repair of advanced roadways. Addibot 430, may be guided to regions that need repair of various types. The need for repair may be detected in various manners such as for example sensors or image capture devices on traffic vehicles, control information provided by human inspectors or roadway users or the like. In another use of the communication infrastructure of the exemplary advanced roadway system, the Addibot can also receive location information from the information and communication systems of the advanced roadway.

Referring to FIG. 5, an illustration of exemplary defects in a roadway 510 is illustrated. Cracks 520 of various types may occur in a roadway surface. There may be numerous causes for the formation of cracks; but after a crack forms it can grow and generate more serious defects as water may begin to infiltrate the crack. A more serious defect may be represented by pothole 530. Here too, there may be numerous causes for the formation of potholes. However, potholes will also tend to grow over time if they are not repaired. For illustrative purposes, pothole 530 is illustrated with a level of water within the pothole. These exemplary types of defects and others may be treated by the utilization of an Addibot.

An Addibot, may be guided to a defect through communication of location information. In other examples, an Addibot may analyze a road surface to detect the presence of cracks or potholes in a non-limiting example. Teams of Addibots may survey roads and repair the defects that are found. Examples have been provided for the repair of potholes in conjunction with advanced roadways, it may be apparent that Addibots may be used in similar manners for repair of such features on generic roadways of various types.

Figure 6A:
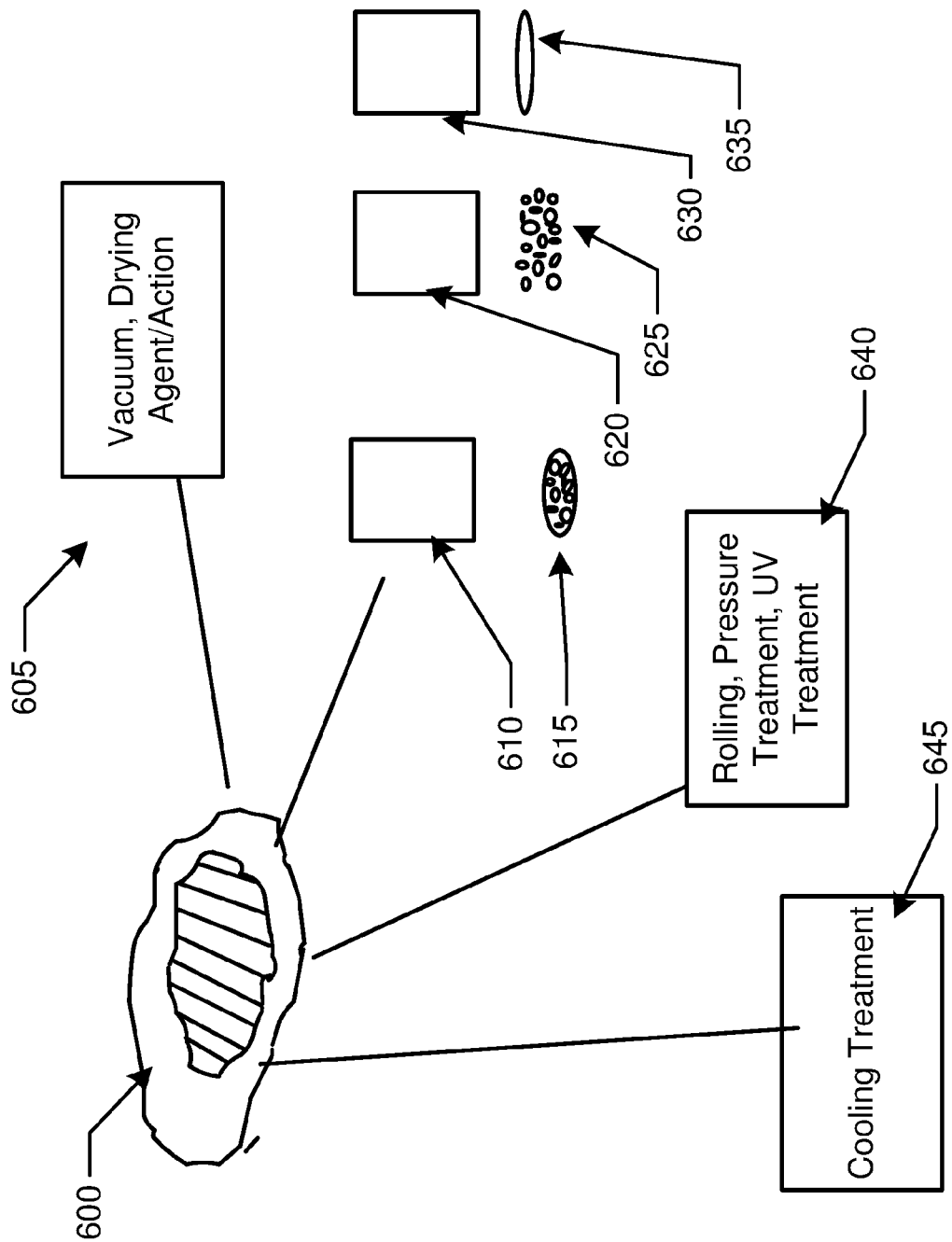
FIG. 6A illustrates exemplary methods related to repair of exemplary pot hole type road defects.

The exemplary Addibot as has be described earlier in the present disclosure may be used to perform a process of repair, and referring to FIG. 6A, a repair on a pothole 600 may be illustrated. An exemplary step for drying the pothole 605 defect may start with a vacuum process or the addition of a drying agent followed by its removal. Next filling material may be added to the pothole. In an example, a composite material 615 of filler and adhesive/sealing material may be added in addition step 610.

In another example of an addition step 620, a layer of filler material 625 such as stone may be added as an example. An addition step 630 may add a layer of adhesive and sealing material 635 upon the layer deposited in the addition step

620. In some examples, the addition step 620 and addition step 630 may be performed and then repeated in sequence numerous times until the pothole 600 is filled to an appropriate level. In some examples, the appropriate fill level may be to the top of the pothole 600 to be level with the surrounding roadway. In other examples the appropriate fill level may be above the level of the surrounding roadway.

In some examples, the filed pothole 600 may be further processed by processing after filling 640. The processing after filling may include rolling or other high pressure treatments to consolidate the filled material. In other examples, treatments with polymerizing treatments such as exposure to Ultra-Violet light (UV) may be performed to initiate polymerization reactions with appropriate polymerizable material if it was included in the adding of a layer of adhesive or sealing material steps. In some examples, a cooling treatment 645 may be performed if the filler material and adhesive and sealing material are added hot or generate heat in their polymerization processing. The cooling treatment 645 may be performed to cool at least a surface layer of the filled material so that traffic may be allowed to run on the repaired roadway.

Figure 6B:
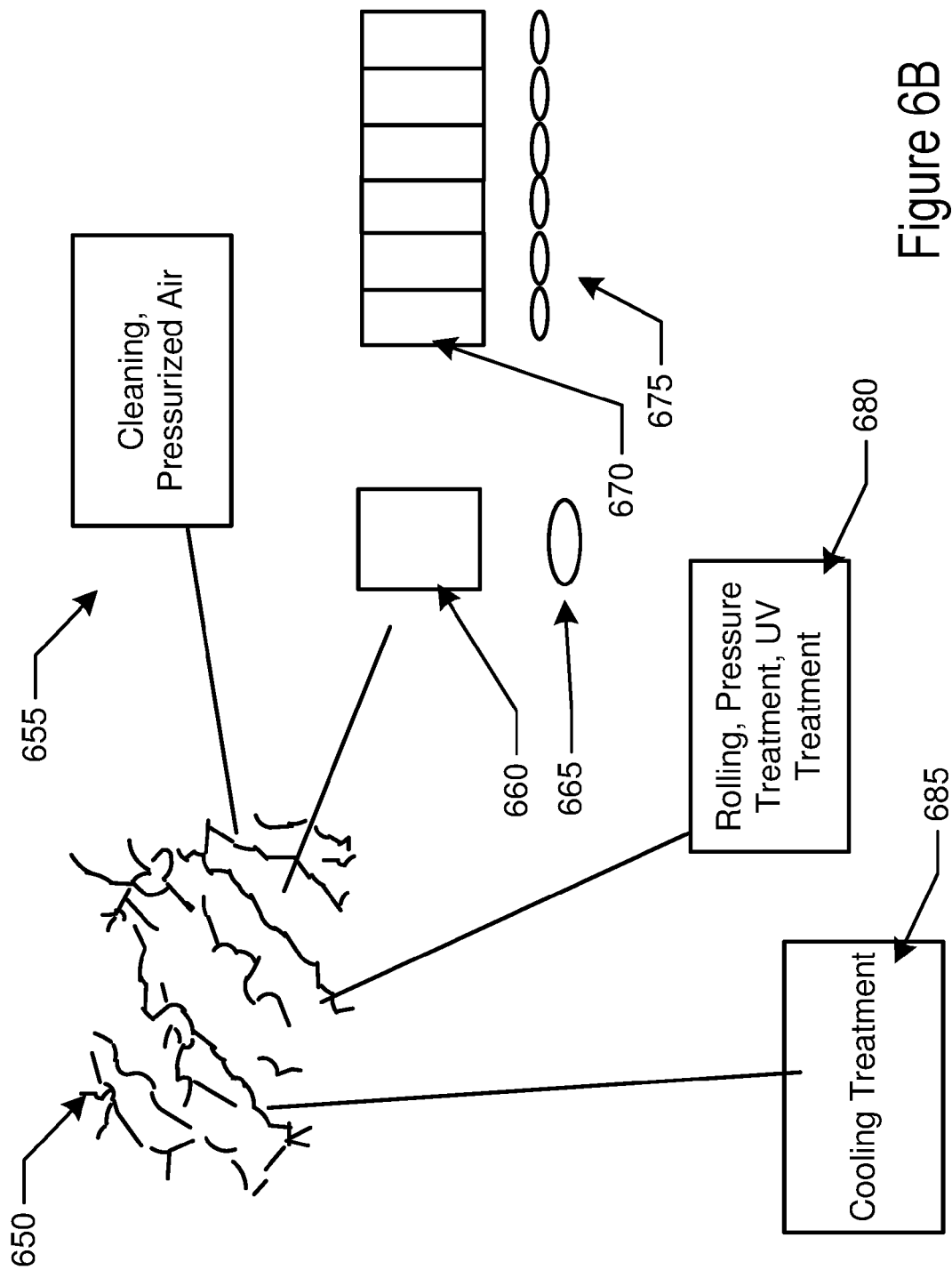
FIG. 6B illustrates exemplary methods related to repair of exemplary crack type road defects.

The exemplary Addibot as has be described earlier in the present disclosure may be used to perform a process of repair, and referring to FIG. 6B, a repair of cracks 650 may be illustrated. An exemplary step for cleaning the cracks 655 may start with a cleaning with pressurized air as a non-limiting example. Next filling material may be added to the crack. In an example, a sealing agent 665 may be added in addition step 660. The Addibot may position a component to perform the addition step 660.

In another example of an addition step 670, an array of components may deposit multiple locations of droplets 675 of sealing material. The pattern of the multiple droplets may be controlled by a controller within the Addibot. As the Addibot moves over the roadway it may dispense sealing material at appropriate locations based on crack location. In some examples, the steps at 660 and 670 may be performed and then repeated in sequence numerous times until the crack 650 at a particular location is filled to an appropriate level. In some examples, the appropriate fill level may be to the top of the crack 650 to be level with the surrounding roadway. In other examples the appropriate file level may be above the level of the surrounding roadway.

In some examples, the filed crack 650 may be further processed by processing after filling 680. The processing after filling may include rolling or other high pressure treatments to consolidate the filled material. In other examples, treatments with polymerizing treatments such as exposure to Ultra-Violet light (UV) may be performed to initiate polymerization reactions with appropriate polymerizable material if it was included in the adding of sealing material steps. In some examples, a cooling treatment 685 may be performed if the filler material and adhesive and sealing material are added hot or generate heat in their polymerization processing. The cooling treatment 685 may be performed to cool at least a surface layer of the filled material so that traffic may be allowed to run on the repaired roadway. Examples have been provided for the repair of cracks in conjunction with discussion of advanced roadway, it may be apparent that Addibots may be used in similar manners for repair of such features on generic roadways of various types.

The interaction of an Addibot and an advanced roadway may be useful in both the respect of creating the advanced roadway and in repairing it. The resulting advanced roadway may also be useful for advanced vehicle operation as well.

Figure 7:
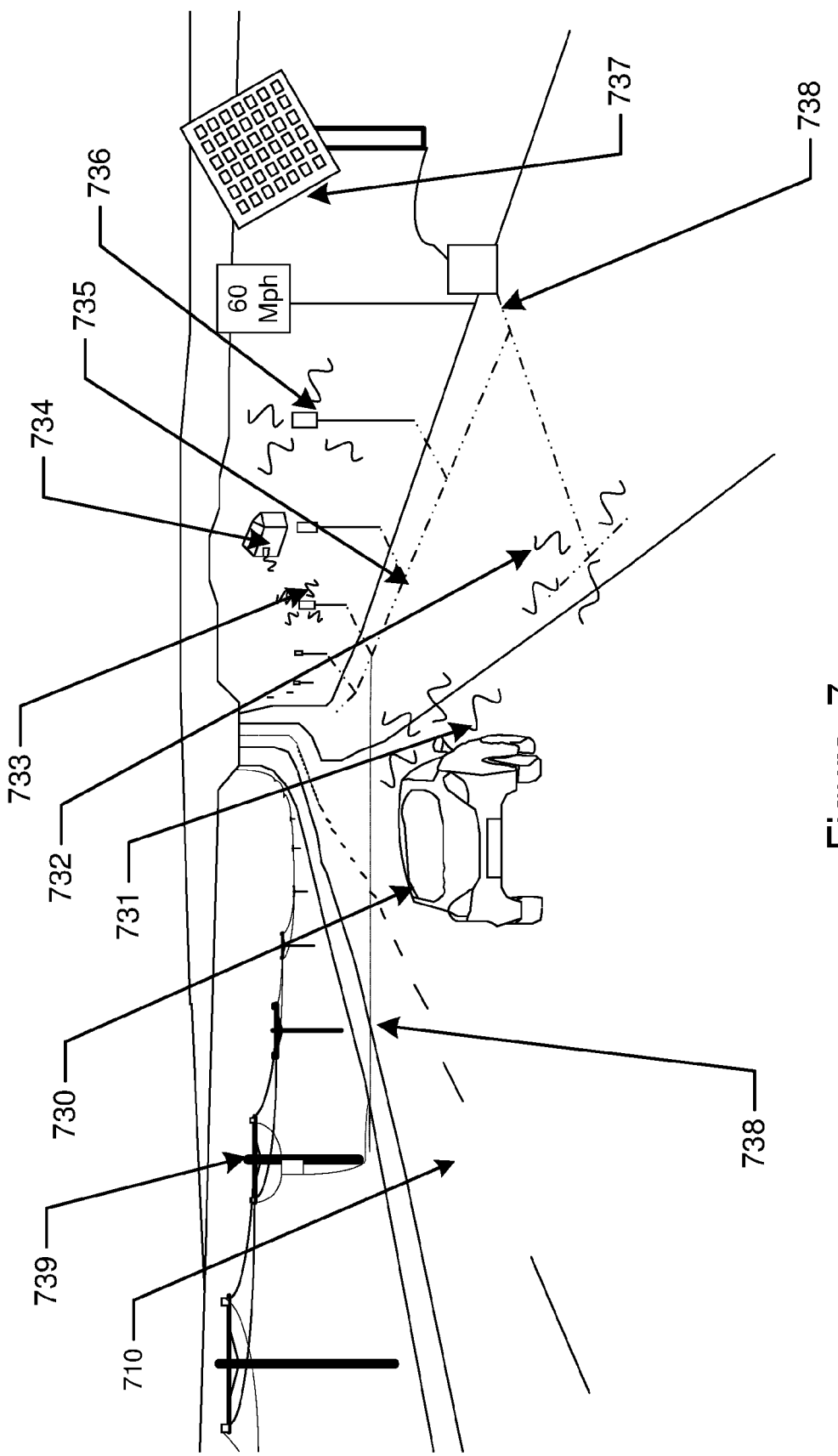
FIG. 7 illustrates an exemplary roadway in concert with an exemplary transportation vehicle capable of interacting with the advanced roadway in similar fashion to those capabilities employed by Addibots used in roadway construction and repair.

In a non-limiting example, driverless cars may receive communication, location information, intra-vehicle information sharing, guidance related information and the like through operation of the components of the advanced roadway as described herein. Referring to FIG. 7, an advanced roadway 710 in conjunction with a vehicle 730 is depicted. In some examples, an advanced roadway may have been formed with use of Addibots in a manner as described. The roadway may be formed with embedded sensors, antennas or other devices for facilitating communication 731 between a vehicle 730 and the advanced roadway 710. Within the advanced roadway 710 may be communication devices 732 that may be buried within the roadway, the shoulder or the side of the roadway or be upon these locations. In some examples, there may be communication devices on roadway poles, signs and the like. The communication 731 may comprise wireless communication and may involve radio frequency, infrared frequency, optical frequency or other forms of wireless communication. In some examples, the advanced roadway may be formed with embedded fibers 735 formed of conductive materials or optical fiber. The embedded fibers 735 may also be considered wires. There may be connection of wires 738 to power sources along the roadway. The power sources may be standalone sources such as solar panels 737 or be connected to power transmission grids 739.

Communication signals may be routed through the advanced roadway and shoulders of roadways as depicted in FIG. 7. In some examples, the communication signals may be routed out of the roadway to wireless transmitter 733 located along the roadway. In some examples, signals may be transmitted from one wireless transmitter 733 to another transmitter 736. A combination of transmission through conduits in the roadbed and to roadside transmitters may be used to transmit signals of various kinds. In some examples the signals may relate to the movement of traffic along the roadway. The signals may also relate to conditions along the roadway as detected by sensors or traffic itself. In other examples the signals may involve communication signals unrelated to the traffic and may be standard communications that are routed along roadways. The signals from the roadside communication transmitters such as wireless transmitter 733 may be routed to neighboring structures 734 such as residences or businesses. The transmissions in some examples may comprise standard internet communication transmissions, or in other examples the signals may relate to traffic flow along the roadway. Autonomous vehicles may use the various communications and sensor pathways as part of technological support of the traffic flow. Signals from traffic may be routed from vehicle to vehicle with the support of the roadway communication system. And, signals from traffic may be routed along wireless pathways to internet connections to central controllers for traffic flow that may be located at off road sites such as neighboring structures 734. The internet connections may be used to transmit signals from and to remote control systems. In some examples, the communication infrastructure of the advanced roadway system may be utilized for data communications that are not related to traffic, repair or other aspects of the roadway itself such as internet connectivity for residential and commercial operations within the vicinity of roadways.

Methods

Figure 8A:
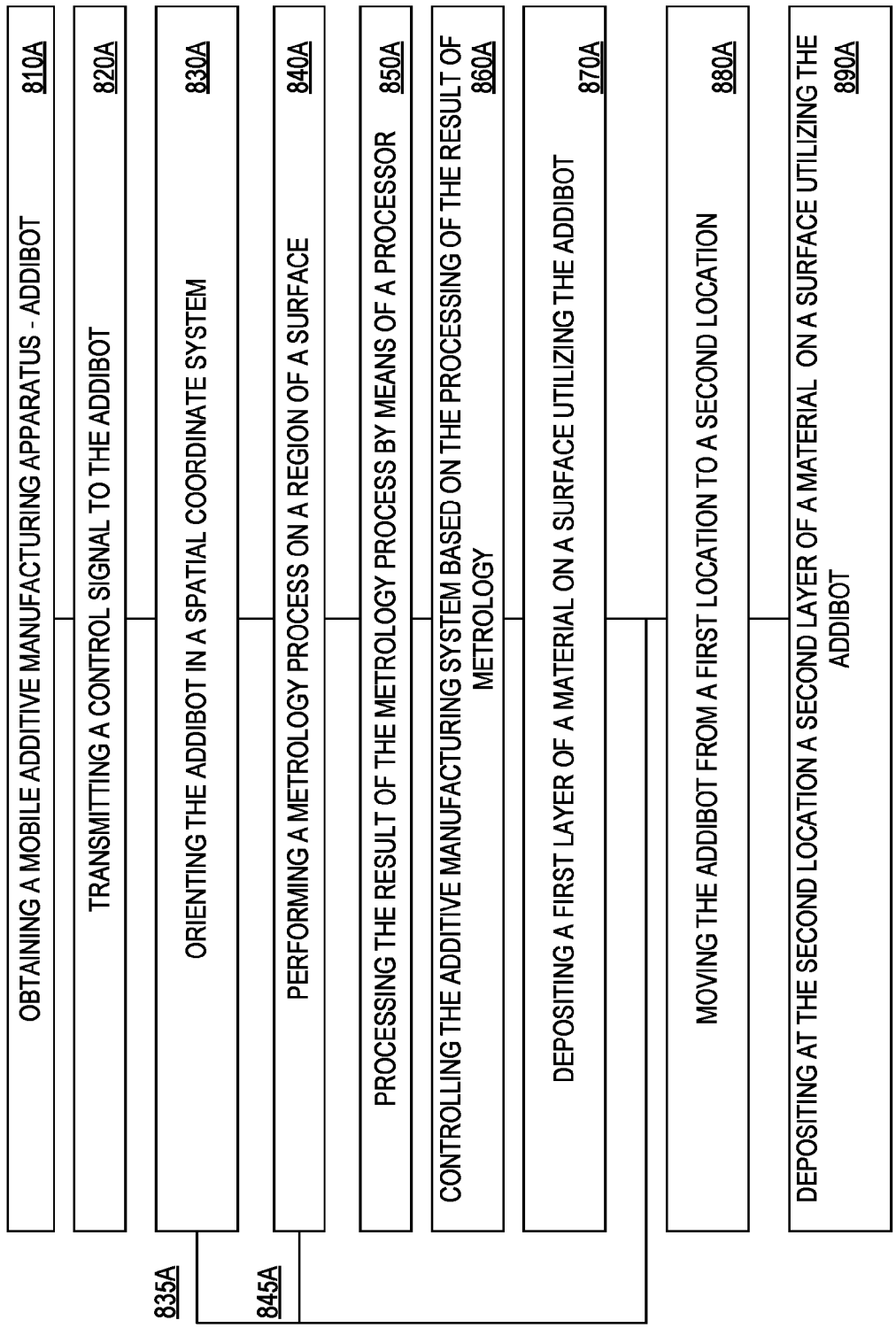
FIG. 8A illustrates exemplary methods related to various examples of Addibots.
Figure 8B:
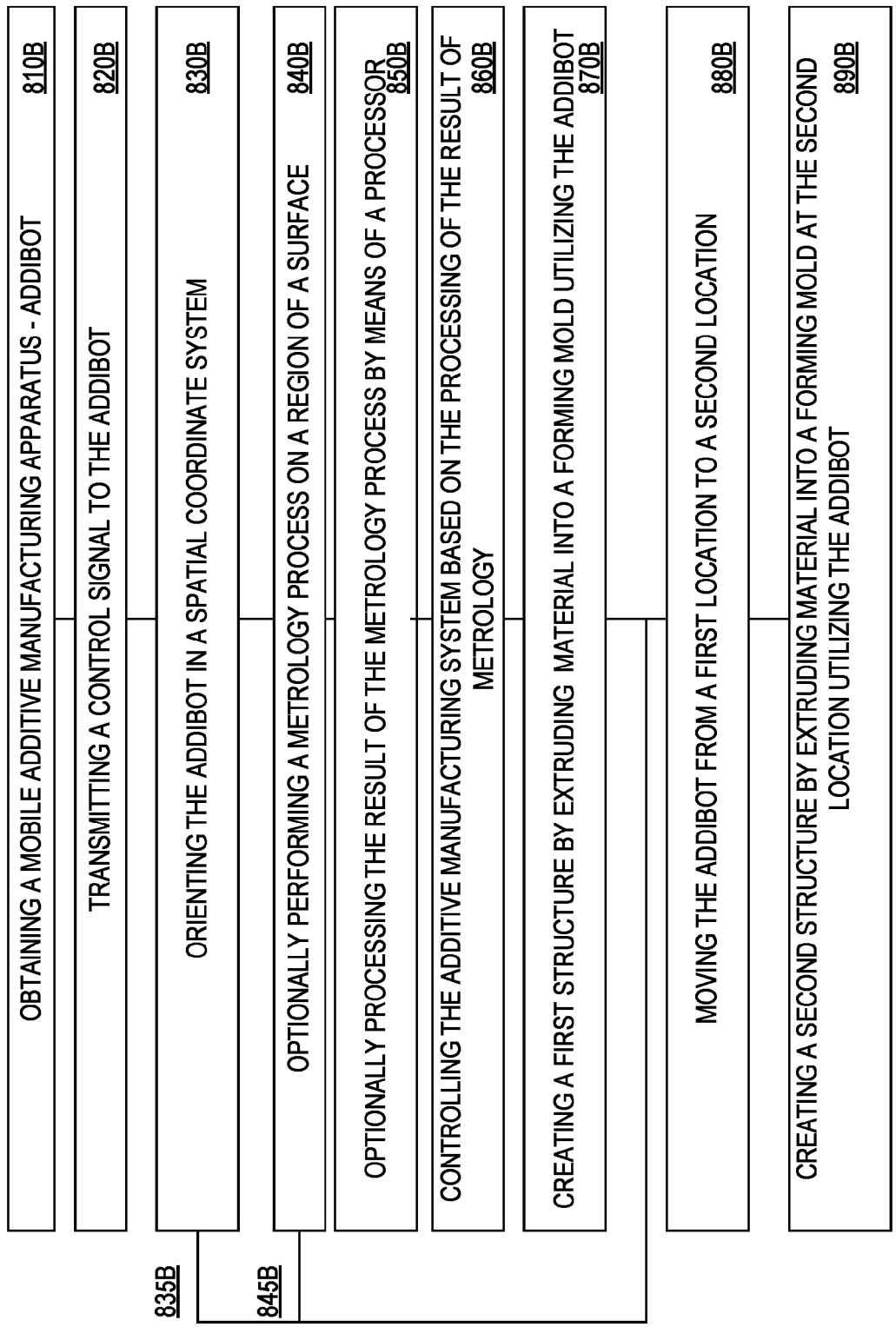
FIG. 8B illustrates exemplary methods related to various examples of Addibots.

There may be numerous methods of utilizing an Addibot, manufacturing an Addibot or creating a product with an Addibot. Referring to FIG. 8A and FIG. 8B, an exemplary set of method steps that may be commonly utilized in numerous examples of Addibots are displayed. The steps are displayed in a flow chart for example. The steps may flexibly be used or not used and the order of the steps may be changed within the scope of the inventive art of Addibots.

Referring to FIG. 8A, at 810A, an Addibot of a particular type may be obtained by a user. Next, at step 820A the user may transmit a control signal to the Addibot. The transmitting may involve numerous means including a wireless transmission, a wired transmission or a transmission involving a physical interaction such as pushing a switch or a display panel of an Addibot. The initiation signal may cause a variety of responses that are proximately caused by the initiation even if further interaction with the user is or is not required or if the Addibot will flexibly respond to its environment or programming thereafter.

At 830A, in some examples the Addibot may perform an orientation step. This step may assess one or more of determining a spatial location in a spatial coordinate system and may also assess movement and direction of movement or potential movement in a spatial coordinate system.

At 840A, in some examples the Addibot may perform a metrology process on a region of a surface. In other examples at 840A an apparatus external to an Addibot may perform a metrology process on a region of a surface and may communicate information to an Addibot related to the metrology or related to the processing of the metrology data in some form 850A. In some examples, these metrology steps may involve the measurement of surface topography in such a manner as to identify cracks and holes or potholes in the surface of a roadway.

Additionally at 850A, in some examples the Addibot may process the result of the metrology by means of a processor. The processor may in some examples identify the presence of a crack or other defect, determine a need for such a feature to be filled or otherwise have action performed on it, and then establish the location information for the feature detected.

At 860A, in some examples the Addibot will utilize the information that it has received in various manners about the surface and any desired model that results from this information and based on a digital model provide controlling signals to the additive manufacturing system. The controlling signals may cause a component to release material onto the surface at a prescribed time as the component becomes located over a desired location.

At 870A, in some examples, the Addibot will deposit a first layer of material on a surface. In some examples, the first layer of material will be comprised of adhesives or sealers. In some other examples, the first layer of material may be comprised of a mixture of aggregate or small solids and an adhesive or sealing agent. In still further examples, the adhesive or sealing agent may be further processed by exposure to an energy source such as a UV light exposure to initial a polymerization reaction in the material.

At 835A, there may be a loop process that occurs in some examples and under some situations that may cause the Addibot to return to step 830B and continue processing. In an alternative example, in some examples, as shown at 845B a loop process may occur that may cause the Addibot to return to step 840B and continue processing.

At 880A, a step may occur where the Addibot is moved from a first location to a second location. In some examples, a characteristic of this movement is that as part of the Addibot moving the additive manufacturing system as a whole moves from a first location to a second location even if portions of the additive manufacturing system could move some or all of the printing head or other additive element to the same second location without a movement of the Addibot.

At step 890A, the Addibot may deposit at the second location a second layer of material. The nature of the second deposit may comprise a different material, or a same material. The nature of the second deposit may comprise a different physical characteristic such as thickness or the same characteristic as a first deposit. The second deposit may be contiguous with a first deposit but be located at a second location and be considered a second deposit, by the very nature of being at a second location.

Referring to FIG. 8B, at 810B, an Addibot of a particular type may be obtained by a user. Next, at step 820B the user may transmit a control signal to the Addibot. The transmitting may involve numerous means including a wireless transmission, a wired transmission or a transmission involving a physical interaction such as pushing a switch or a display panel of an Addibot. The initiation signal may cause a variety of responses that are proximately caused by the initiation even if further interaction with the user is or is not required or if the Addibot will flexibly respond to its environment or programming thereafter.

At 830B, in some examples the Addibot may perform an orientation step. This step may assess one or more of determining a spatial location in a spatial coordinate system and may also assess movement and direction of movement or potential movement in a spatial coordinate system.

At 840B, in some examples the Addibot may perform a metrology process on a region of a surface. In other examples at 840B an apparatus external to an Addibot may perform a metrology process on a region of a surface and may communicate information to an Addibot related to the metrology or related to the processing of the metrology data in some form 850B. In some examples, these metrology steps may involve the measurement of surface topography in such a manner as to allow for the adjustment of the level of a forming mold as it is placed to interact with the surface.

Additionally at 850B, in some examples the Addibot may process the result of the metrology by means of a processor. The processor may in some examples identify the level of the surface. In other examples the processor may identify the presence of a crack or other defect, determine a need for such a feature to be filled or otherwise have action performed on it, and then establish the location information for the feature detected. In some examples, the detection of a defect may cause the Addibot to send a signal and wait for a user to interact with the Addibot for additional controls.

At 860B, in some examples the Addibot will utilize the information that it has received in various manners about the surface and any desired model that results from this information and based on a digital model provide controlling signals to the additive manufacturing system. The controlling signals may cause the Addibot to adjust the level of components within the Addibot; or the level of the Addibot frame itself.

At 870B, in some examples, the Addibot may create a first structure by extruding material into a forming mold. In some examples, the first layer of material will be comprised of thermoplastics or other extrusion materials. In some examples, the Addibot may fill a portion of the resulting formed structure with wall forming materials such as cement. In other examples, the Addibot may signal the completion of a first structure formation and another device or another Addibot may add wall forming materials to the thus formed structure.

At 835B, there may be a loop process that occurs in some examples and under some situations that may cause the Addibot to return to step 830B and continue processing. In an alternative example, in some examples, as shown at 845B a loop process may occur that may cause the Addibot to return to step 840B and continue processing.

At 880B, a step may occur where the Addibot is moved from a first location to a second location. In some examples, a characteristic of this movement is that as part of the Addibot moving the additive manufacturing system as a whole moves from a first location to a second location even if portions of the additive manufacturing system could move some or all of the printing head or other additive element to the same second location without a movement of the Addibot. Forming mold pieces that may be present in the Addibot may be moved vertically upwards and downwards in the process of readying the Addibot for movement and then preparing the Addibot for a next processing step.

At step 890B, the Addibot may create a second structure by extruding material into a forming mold at the second location. The nature of the second structure formed may comprise a different material, or a same material. The nature of the second structure formed may comprise a different physical characteristic such as thickness or the same characteristic as a first deposit. The second structure formed may be contiguous with a first structure formed but be located at a second location and be considered a second structure, by the very nature of being at a second location.

Control Systems

Figure 9:
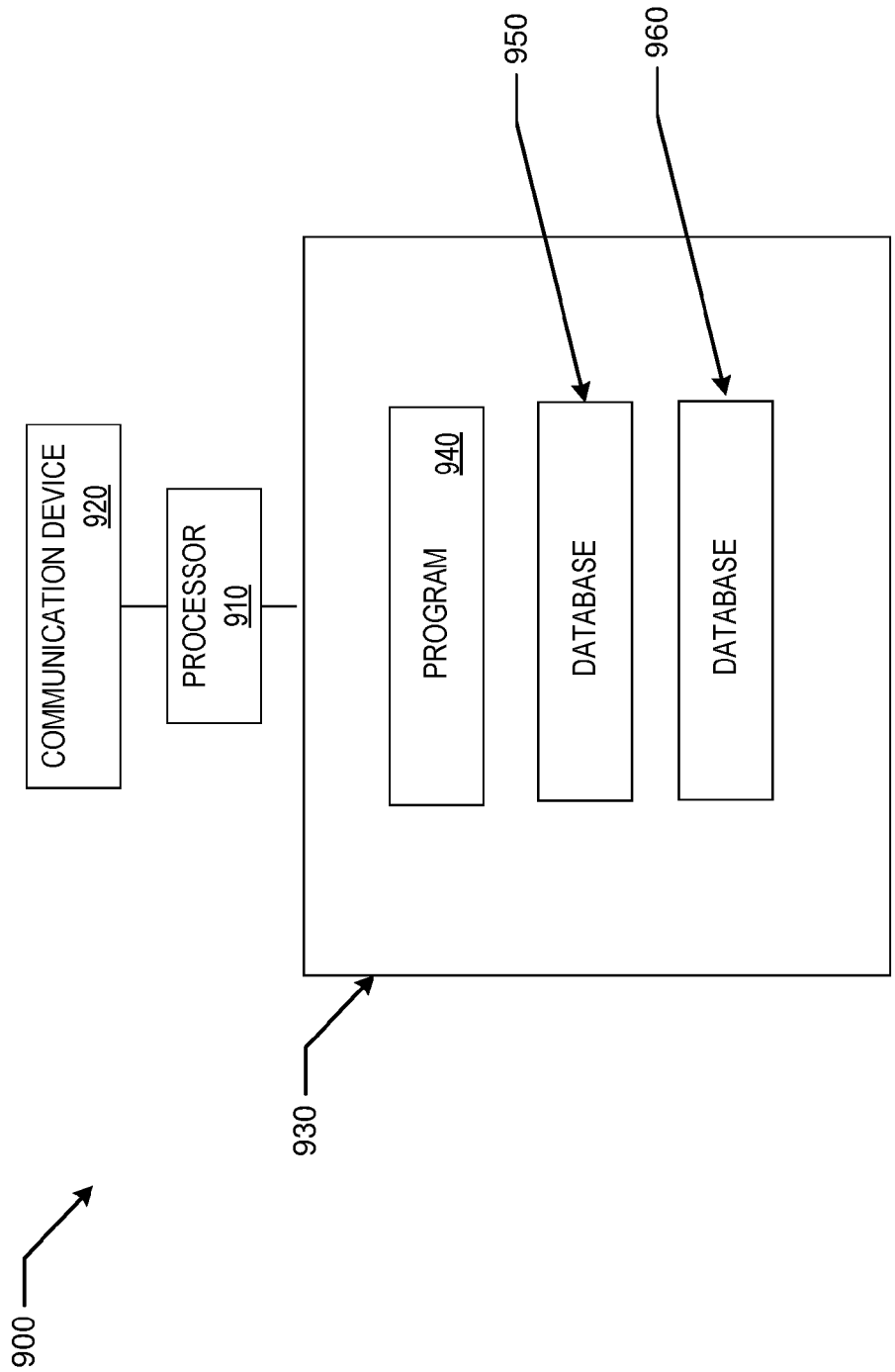
FIG. 9 illustrates a processor and controller that may be useful in various examples of Addibots.

Referring now to FIG. 9, a controller 900 is illustrated that may be used in some examples of a mobile additive manufacturing apparatus. The controller 900 includes a processor 910, which may include one or more processor components. The processor may be coupled to a communication device 920.

The processor 910 may also be in communication with a storage device 930. The storage device 930 may comprise a number of appropriate information storage device types, including combinations of magnetic storage devices including hard disk drives, optical storage devices, and/or semiconductor memory devices such as Flash memory devices, Random Access Memory (RAM) devices and Read Only Memory (ROM) devices.

At 930, the storage device 930 may store a program 940 which may be useful for controlling the processor 910. The processor 910 performs instructions of the program 940 which may affect numerous algorithmic processes and thereby operates in accordance with mobile additive manufacturing equipment. The storage device 930 can also store Addibot related data in one or more databases 950, 960. The databases 950,960 may include specific control logic for controlling the deposition of material at each of the additive manufacturing components which may be organized in matrices, arrays or other collections to form a portion of an additive manufacturing system.

While the disclosure has been made in conjunction with specific examples, it is evident that many alternatives, modifications and variations will be apparent to those skilled in the art in light of the foregoing description. Accordingly, this description is intended to embrace all such alternatives, modifications and variations as fall within its spirit and scope. Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed invention. Moreover, although features may be described above as acting in certain combinations and even initially claimed as such, one or more features from a claimed combination can in some cases be excised from the combination, and the claimed combination may be directed to a sub-combination or variation of a sub-combination.

In some examples of roadway construction and repair and construction of walls, the additive manufacturing components of an Addibot may have been described in relationship to extrusion apparatus with molding forms to form the extruded material. There may be other additive manufacturing techniques such as extrusion from spatially controlled nozzles and other additive manufacturing techniques. In some examples of the creation of structures, the formation of walls have been described, there may be numerous structures that may be created in similar methods consistent with the present disclosure, such as sculptures and foundations as non-limiting examples Moreover, the separation of various system components in the embodiments described above should not be understood as requiring such separation in all embodiments. Examples of Addibots may include all system components or a subset of components and may act in multiples to perform various functions. Thus, while particular embodiments of the subject matter have been described, other embodiments are within the scope of the following claims.

What is claimed is:

1. A method for forming and repairing a roadway comprising:
   transmitting a control signal to an apparatus, wherein the apparatus is a mobile additive manufacturing apparatus comprising:
      a controller capable of executing algorithms and providing control signals,
      an additive manufacturing system to deposit a material or combination of materials in prescribed locations across a surface of the roadway according to a first digital model processed by the controller,
      a vision system, wherein the vision system scans the surface and measures a topography of the surface while the mobile additive manufacturing apparatus passes thereover,
      a drive system operative to transport the additive manufacturing system along the surface, a navigation system to determine a location of the additive manufacturing system and guide the drive system, and a power system capable of providing power to operate at least the drive system, navigation system, controller and additive manufacturing system;

performing a metrology process to measure a topography of a region of the surface and locating defects of the region of the surface with the measured topography;

forming a first deposit of a first material on the surface;

moving the apparatus to a different location; and forming a second deposit of a second material on the different location.

2. The method of claim 1 wherein the second material is conductive.

3. The method of claim 2 wherein a channel is formed within the first deposit.

4. The method of claim 3 wherein a wire or fiber is located within the channel.

5. The method of claim 4 additionally comprising:

adding a roadway bed upon the surface and the first deposit; and transporting an internet connected signal through the wire or fiber.

6. The method of claim 1 wherein the first material comprises a molten material with one or more of embedded fibers, nanofibers, or nanotubes.

7. A method for forming and repairing a roadway comprising:

transmitting a control signal to an apparatus, wherein the apparatus is a mobile additive manufacturing apparatus comprising:

a controller capable of executing algorithms and providing control signals, an additive manufacturing system to deposit a material or combination of materials in prescribed locations across a surface of the roadway according to a first digital model processed by the controller, a vision system, wherein the vision system scans the surface and measures a topography of the surface while the mobile additive manufacturing apparatus passes thereover, a drive system operative to transport the additive manufacturing system along the surface, a navigation system to determine a location of the additive manufacturing system and guide the drive system, and a power system capable of providing power to operate at least the drive system, navigation system, controller and additive manufacturing system;

forming a first deposit of a first material on the surface;

moving the apparatus to a different location;

forming a second deposit of a second material on the different location;

wherein the first material comprises a molten material with one or more of embedded fibers, nanofibers, or nanotubes; and wherein a roadway bed is deposited upon the first material.

8. The method of claim 7 wherein the first material partially melts into the roadway bed.

9. The method of claim 1 wherein the first material comprises a composite mixture of a filler and an adhesive.

10. The method of claim 1 wherein the apparatus establishes a wireless communication link with a wireless system embedded within the roadway.

11. The method of claim 1 wherein the forming of a first deposit utilizes a feeding apparatus, wherein the feeding apparatus feeds extrusion material into a heated extrusion head.

12. The method of claim 1 wherein the additive manufacturing system deposits multiple locations of the first material in a parallel fashion.

13. The method of claim 1 wherein the additive manufacturing system further comprises a source of UV light.

14. The method of claim 1 wherein the additive manufacturing system further comprises an array of UV light sources.

15. The method of claim 14 wherein the array of UV light sources comprises at least a first row and a first column.

16. The method of claim 13 wherein the first deposit is sensitive to UV light.

17. The method of claim 16 further comprising irradiating the first deposit with the source of UV light.

18. The method of claim 1 wherein the additive manufacturing system further comprises a source of energetic light to cause the first deposit to polymerize.

19. The method of claim 18 wherein additive manufacturing system further comprises an array of energetic light sources.

* * * * *